U S010051529B2

United States Patent
Fu et al.

(10) Patent No.: US 10,051,529 B2
(45) Date of Patent: Aug. 14, 2018

(54) METHOD, DEVICE AND SYSTEM FOR SWITCHING UNDER BEARER SEPARATION SCENARIO

(71) Applicant: China Academy of Telecommunications Technology, Beijing (CN)

(72) Inventors: Zhe Fu, Beijing (CN); Dajun Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 60 days.

(21) Appl. No.: 14/759,233

(22) PCT Filed: Jan. 6, 2014

(86) PCT No.: PCT/CN2014/070139
§ 371 (c)(1),
(2) Date: Jul. 6, 2015

(87) PCT Pub. No.: WO2014/106483
PCT Pub. Date: Jul. 10, 2014

(65) Prior Publication Data
US 2015/0358865 A1 Dec. 10, 2015

(30) Foreign Application Priority Data
Jan. 6, 2013 (CN) .......................... 2013 1 0003654

(51) Int. Cl.
*H04W 36/00* (2009.01)
*H04W 84/04* (2009.01)
(52) U.S. Cl.
CPC ... *H04W 36/0055* (2013.01); *H04W 36/0033* (2013.01); *H04W 36/0027* (2013.01); *H04W 84/045* (2013.01)

(58) Field of Classification Search
CPC ......... H04W 36/0055; H04W 36/0033; H04W 84/045; H04W 36/0027
(Continued)

(56) References Cited

U.S. PATENT DOCUMENTS

| 2010/0113031 A1 | 5/2010 | Kim et al. | |
| 2014/0120921 A1* | 5/2014 | Keskitalo | H04W 36/0061 455/438 |

FOREIGN PATENT DOCUMENTS

| CN | 102685826 A | 9/2012 |
| CN | 102833802 A | 12/2012 |
| WO | 2011/137784 A1 | 11/2011 |
| WO | 2011137784 A | 11/2011 |

OTHER PUBLICATIONS

International Search Report for PCT/CN2014/070139.
(Continued)

*Primary Examiner* — Tanmay Shah
(74) *Attorney, Agent, or Firm* — Kilpatrick Townsend & Stockton LLP

(57) ABSTRACT

Disclosed are a method, device and system for switching under a bearer separation scenario, which solve the problem that there are no specific implementation solutions when a UE switches among macro eNBs or processing solutions of data transmission during the switching process, aiming at the bearer separation scenario in the existing protocol. The method of the embodiments of the present application comprises: after a source macro eNB determines that there is a need for performing a switching process of a UE, sending a switching request to each spare target macro eNB, the switching request carrying information for indicating that the UE is in a bearer-separated state and information about the local node where the UE is currently located, and/or the bearer information about the UE which is currently on the local node; and selecting a target macro eNB to switch to for the UE from the spare target macro eNBs
(Continued)

which return switching request responses, sending the switching commands carried in the switching request responses returned from the switch target macro eNB to the UE, stopping sending data to the UE and stopping receiving data sent from the UE.

6 Claims, 12 Drawing Sheets

(58) Field of Classification Search
USPC .......................................................... 455/436
See application file for complete search history.

(56) References Cited

OTHER PUBLICATIONS

ZTE: "Consideration on the inter-MeNB, handover enhancement in dual connectivity", 3GPP Draft; R3-150238, 3rd Generation Technical Fields Partnership Project (3GPP), Mobile Searched Competence Centre ; 650, Route Des Lucioles ; F-06921 Sophia-Antipolis Cedex ; France, vol. RAN WG3, No. Athens, Greece; Feb. 9, 2015-Feb. 13, 2015 Feb. 8, 2015 (Feb. 8, 2015), XP050936991, Retrieved from the Internet: URL:http://www.3gpp.org/ftp/Meetings_3GPP_SYNC/RAN3/Docs/ [retrieved on Feb. 8, 2015] *section 2.1 * * figures 2.1-2 *.

CMCC: "HO signaling flow for small cell enhancement", 3GPP Draft; R3-132227 HO Signaling Flow for Small Cell ENHANCrMENT, 3rd Generation Partnership Project (3GPP), Mobile Competence Centre ; 650, Route Des Lucioles ; F-06921 Sophia-Antipolis Cedex ; FRA, vol. RAN WG3, No. San Francisco, U.S; Nov. 11, 2013-Nov. 15, 2013 Nov. 12, 2013 (Nov. 12, 2013), XP050738271, Retrieved from the Internet: URL:http://www.3gpp.org/ftp/Meetings_3GPP_SYNC/RAN/RAN3/Docs/ [retrieved on Nov. 12, 2013] * section 2.3.1 * * figure 3 *.

The Partial Supplementary European Search Report dated Jan. 7, 2016 in the EP counterpart application (14735249.6).

* cited by examiner

METHOD, DEVICE AND SYSTEM FOR SWITCHING UNDER BEARER SEPARATION SCENARIO

This application is a US National Stage of International Application No. PCT/CN2014/070139, filed on Jan. 6 2014, designating the United States, and claiming the benefit of Chinese Patent Application No. 201310003654.5, filed with the State Intellectual Property Office of People's Republic of China on Jan. 6, 2013 and entitled "Method, device and system for switching under a bearer separation scenario", which is hereby incorporated by reference in its entirety.

FIELD

The present invention relates to the field of wireless communications and particularly to a method, device and system for performing handover under a bearer separation scenario.

BACKGROUND

At present an Evolved Universal Terrestrial Radio Access Network (E-UTRAN) consists of evolved Node Bs (eNBs), and FIG. 1 illustrates the network architecture of the E-UTRAN, where an eNB functions as an access network and communicates with a User Equipment (UE) via an air interface. There are both a control plane connection and a user plane connection between the UE and the eNB.

Each UE attached to the network is served by a Mobility Management Entity (MME) which is referred to a serving MME of the UE, and the MME is connected with the eNB via an S1-MME interface which provides the UE with control plane services including mobility management and bearer management functions; and each UE attached to the network is served by a Serving Gateway (S-GW) which is referred to as a serving S-GW of the UE. The S-GW is connected with the eNB via an S1-U interface which providing the UE with user plane services, and user plane data of the UE are transmitted between the S-GW and the eNB over an S1-U bearer.

As there is a constantly growing demand of subscribers for a data service rate and a service capacity, the traditional scheme for the network with single-layer coverage by a macro eNB has not been able to satisfy the demand of the subscribers, so layered network deployment has been introduced in the 3$^{rd}$ Generation Partnership Project (3GPP), and FIG. 2 illustrates the network architecture of the layered network, where a macro eNB provides underlying coverage, and a low-power local eNB provides hotspot coverage; and there is a data/signaling interface (which can be a wired or wireless interface) between the local node and the macro eNB, and a UE can operate while being served by the macro eNB or the local eNB.

Since a cell controlled by the local eNB (e.g., a small cell) has such a small coverage area that there are a small number of UEs served by the cell, a UE connected with the local eNB tends to be provided with a higher quality of service, e.g., a higher service rate, a link with a higher quality, etc. Thus when a UE connected with the macro eNB enters the coverage area of the cell controlled by the local eNB, the UE can be transferred to the local eNB to obtain the service provided by the local eNB; and when the UE leaves away from the coverage area of the cell controlled by the local eNB, the UE needs to be transferred to a cell controlled by the macro eNB to keep wirelessly connected.

FIG. 3 illustrates a X2 handover process including the following operations in the existing Long Term Evolution (LTE):

Operation 301: A source eNB configures a UE for measurement, and the UE performs measurement according to received measurement configuration information;

Operation 302: The UE reports a measurement result to the source eNB to assist the source eNB in making a handover decision;

Operation 303: The source eNB makes a handover decision. If the source eNB decides to perform handover, then the process continues with subsequent operations;

Operation 304: The source eNB transmits a handover request message carrying handover preparation related information to a target eNB;

Operation 305: The target eNB performs admission control according to the received handover request message and configures a new bearer including a Signaling Radio Bearer (SRB), and Packet Data Convergence (PDCP), Radio Link Control (RLC), Media Access Control (MAC) and other entities. If the configuration succeeds, then the operation 306 will be performed;

Operation 306: The target eNB returns a handover request response message to the source eNB;

Operation 307: The source signals a received handover command to the UE in a Radio Resource Control (RRC) connection reconfiguration message and also stops data from being transmitted and received with the present eNB for the UE; and the UE stops data from being transmitted and received with the source eNB upon reception of the RRC reconfiguration message;

Operation 308: The source eNB transmits Serial Number (SN) state information of ongoing data transmission to the target eNB;

Operation 309: The UE initiates an uplink/downlink synchronization procedure to the target eNB, and initiates a non-contention random access procedure after downlink synchronization is completed;

Operation 310: The target eNB returns a Random Access Channel (RACH) Response message carrying an uplink resource, and a Timing Advance (TA) of the UE, allocated for the UE;

After the uplink synchronization is completed, the UE transmits and receives a user plane bearer and a control plane bearer using a new security key and the new PDCP, RLC and MAC entities;

Operation 311: The UE returns a handover completion message (i.e., an RRC reconfiguration complete message) to the target eNB; and thereafter the UE can transmit and receive data with the target eNB;

Correspondingly the target eNB returns an RLC Acknowledgement (ACK) message upon reception of the RRC reconfiguration complete message; and the UE starts to transmit uplink data of the user plane upon reception of the ACK message to the RRC reconfiguration complete message;

Operation 312: The target eNB initiates a Path Switch Request to an MME;

Operation 313: The MME initiates a Bearer Modify Request to an S-GW;

Operation 314: The S-GW switches the path;

Operation 315: The S-GW returns a Bearer Modify Response to the MME;

Operation 316: The MME returns a Path Switch Response to the target eNB; and thus the path has been switched;

Operation 317: The target eNB transmits a UE Context Release instruction to the source eNB; and Operation 318: The source eNB releases the related resource allocated for the switched UE.

Since there are such a large number of local eNBs with small coverage that the UE may be handed over frequently between the cell corresponding to the macro eNB and the cell corresponding to the local eNB, a network deployment scenario where the user plane is separated from the control plane has been introduced in order to lower the frequency at which the UE is handed over, and at this time the UE is connected with both of the eNBs, and there are the following two network architectures proposed at present where bearers are separated:

In a first architecture as illustrated in FIG. 4, all of SRBs of the UE are maintained at the macro eNB, and all or a part of Data Radio Bearers (DRBs) are transferred to the local eNB for transmission, where an interface represented in dotted lines exist only if a part of the DRBs are separated.

In a second architecture as illustrated in FIG. 5, this architecture differs from the first architecture generally in that the local eNB can perform a part of RRC management functions (e.g., radio resource management or measurement, etc.), but RRC connections are still maintained at the macro eNB.

For the deployment of a HetNet, such a scenario may occur that a small cell is deployed in a macro coverage area of a plurality of macro eNBs, as illustrated in FIG. 6, where the small cell is located in an area in which two macro eNBs overlap, and in this scenario, the performance in the edge area of the macro eNB and the satisfaction of an edge user can be improved. The UE for which bearers are separated may need to be handed over from one of the macro eNB (referred to a source macro eNB) to the other macro eNB (referred to a target macro eNB), and then there has been absent in the existing protocol a solution to the UE performing handover between the macro eNBs in the bear separation scenario, particularly in the bear separation scenario where the local eNB or the small cell is shared by the plurality of macro eNBs.

In summary, there has been absent in the existing protocol a particular solution to performing handover of a UE between macro eNBs, and a particular solution to transmitting data in the handover process, in the bear separation scenario.

SUMMARY

Embodiments of the invention provide a method, device and system for perform handover in a bearer separation scenario so as to address the absence in the existing protocol of a particular solution to a handover of a UE between macro eNBs, and a particular solution to transmitting data in the handover process, in the bearer separation scenario.

An embodiment of the invention provides a method for switching in a bear separation scenario, the method including:

transmitting, by a source macro evolved Node B, eNB, a handover request to each candidate target macro eNB upon determining that there is a need for performing a handover of a User Equipment, UE, wherein the handover request carries state information indicating that bearers are separated for the UE, and information about a local node where the UE currently resides and/or information about current bearers of the UE at the local node; and selecting, by the source macro eNB, from candidate target macro eNBs returning a handover request response, a target macro eNB to perform the handover for the UE, transmitting a handover command carried in the handover request response returned by the handover target macro eNB to the UE, and stopping transmitting data to the UE and receiving data transmitted by the UE.

An embodiment of the invention provides a method for performing handover in a bearer separation scenario, the method including:

making, by a candidate target macro evolved Node B, eNB, an admission decision upon reception of a handover request transmitted by a source macro eNB, wherein the handover request carries state information indicating that bearers are separated for a User Equipment, UE; and performing, by the candidate target macro eNB, underlying configuration of the UE at the present eNB, and returning a handover request response message to the source macro eNB, upon determining that the present eNB allows the UE to be admitted and supports bearer separation, wherein the handover request response carries a handover command carrying a bearer separation support acknowledgement message and instructing the UE to perform the handover.

An embodiment of the invention provides a method for performing handover in a bearer separation scenario, the method including:

stopping, by a User Equipment, UE, transmitting data to a source macro evolved Node B, eNB and receiving data transmitted by the source macro eNB, and initiating a synchronization procedure to a handover target macro eNB, upon reception of a handover command, transmitted by the source macro eNB, carrying a bearer separation support acknowledgement message, wherein the UE stops transmitting data to a local node and receiving data transmitted by the local node, or keeps on transmitting data to the local node and receiving data transmitted by the local node; and transmitting, by the UE, data respectively with the handover target macro eNB and the local node after completing the synchronization procedure with the handover target macro eNB.

An embodiment of the invention provides a method for performing handover in a bearer separation scenario, the method including:

receiving, by a local node, configuration information transmitted by a source macro evolved Node B, eNB, or a handover target macro eNB; and transmitting, by the local node, data respectively with the User Equipment, UE, and the handover target macro eNB using security parameters, carried in the configuration information, configured by the handover target macro eNB, wherein the local node stops transmitting data to the UE and receiving data transmitted by the UE, or keeps on transmitting data to the UE or receiving data transmitted by the UE, in the handover procedure.

An embodiment of the invention provides a macro eNB including:

a first processing module configured to transmit a handover request to each candidate target macro eNB upon determining that there is a need for performing a handover of a User Equipment, UE, wherein the handover request carries state information indicating that bearers are separated for the UE, and information about a local node where the UE currently resides and/or information about current bearers of the UE at the local node; and a second processing module configured to select from candidate target macro eNBs returning a handover request response a target macro eNB to perform the handover for the UE, to transmit a handover command carried in the handover request response returned by the handover target macro eNB to the UE, and to stop transmitting data to the UE and receiving data transmitted by the UE.

An embodiment of the invention provides another macro eNB including:

a first control module configured to make an admission decision upon reception of a handover request transmitted by a source macro eNB, wherein the handover request carries state information indicating that bearers are separated for a User Equipment, UE; and a second control module configured to perform underlying configuration of the UE at the present eNB, and to return a handover request response to the source macro eNB, upon determining that the present eNB allows the UE to be admitted and supports bearer separation, wherein the handover request response carries a handover command carrying a bearer separation support acknowledgement message and instructing the UE to perform the handover.

An embodiment of the invention provides a user equipment including:

a first managing module configured to stop transmitting data to a source macro evolved Node B, eNB, and receiving data transmitted by the source macro eNB, and to initiate a synchronization procedure to a handover target macro eNB, upon reception of a handover command, transmitted by the source macro eNB, carrying a bearer separation support acknowledgement message, wherein the UE stops transmitting data to a local node and receiving data transmitted by the local node, or keeps on transmitting data to the local node and receiving data transmitted by the local node; and a second managing module configured to transmit data respectively with the handover target macro eNB and the local node after completing the synchronization procedure with the handover target macro eNB.

An embodiment of the invention provides a local node including:

a receiving module configured to receive configuration information transmitted by a source macro evolved Node B, eNB, or a handover target macro eNB; and a transmitting module configured to transmit data respectively with a User Equipment, UE, and the handover target macro eNB using security parameters, carried in the configuration information, configured by the handover target macro eNB, wherein the transmitting module stops transmitting data to the UE and receiving data transmitted by the UE, or keeps on transmitting data to the UE or receiving data transmitted by the UE, in the handover procedure.

An embodiment of the invention provides a communication system including:

a source macro evolved Node B, eNB, configured to transmit a handover request to each candidate target macro eNB upon determining that there is a need for performing a handover for a User Equipment, UE, wherein the handover request carries state information indicating that bearers are separated for the UE, and information about a local node where the UE currently resides and/or information about current bearers of the UE at the local node; and to select from candidate target macro eNBs returning a handover request response a target macro eNB to perform the handover for the UE, to transmit a handover command carried in the handover request response returned by the handover target macro eNB to the UE, and to stop receiving data to the UE and receiving data transmitted by the UE;

the handover target macro eNB configured to make an admission decision upon reception of the handover request transmitted by the source macro eNB; to perform underlying configuration of the UE at the present eNB, and to return the handover request response to the source macro eNB, upon determining that the present eNB allows the UE to be admitted and supports bearer separation, wherein the handover request response carries a switch command carrying a bearer separation support acknowledgement message and instructing the UE to to perform the handover;

the UE configured to stop transmitting data to the source macro eNB and receiving data transmitted by the source macro eNB, and to initiate a synchronization procedure to the handover target macro eNB, upon reception of the handover command, transmitted by the source macro eNB, carrying the bearer separation support acknowledgement message, wherein the UE stops transmitting data to the local node and receiving data transmitted by the local node, or keeps on transmitting data to the local node and receiving data transmitted by the local node; and to transmit data respectively with the handover target macro eNB and the local node after completing the synchronization procedure with the handover target macro eNB;

the local node configured to receive configuration information transmitted by the source macro eNB or the handover target macro eNB; and to transmit data respectively with the UE and the handover target macro eNB using security parameters, carried in the configuration information, configured by the handover target macro eNB, wherein the local node stops transmitting data to the UE and receiving data transmitted by the UE, or keeps on transmitting data to the UE or receiving data transmitted by the UE, in the handover procedure.

The embodiments of the invention proposes a particular solution to the handover of a UE, for which bearers are separated, from a source macro eNB to a target macro eNB, and a particular solution to processing data in the handover process, in the bearer separation scenario so as to address the absence in the existing protocol of a particular solution to the handover of the UE between the macro eNBs, and a particular solution to transmitting data in the handover process, in the bearer separation scenario.

DETAILED DESCRIPTION OF THE EMBODIMENTS

The embodiments of the invention proposes a particular solution to performing handover for a UE, for which bearers are separated, from a source macro eNB to a target macro eNB, and a particular solution to transmitting data in the handover process, in the bear separation scenario so as to address the problem that there has been absent in the existing protocol a particular solution to performing handover of the UE between the macro eNBs, and a particular solution to transmitting data in the handover process, in the bear separation scenario.

Figure 1:
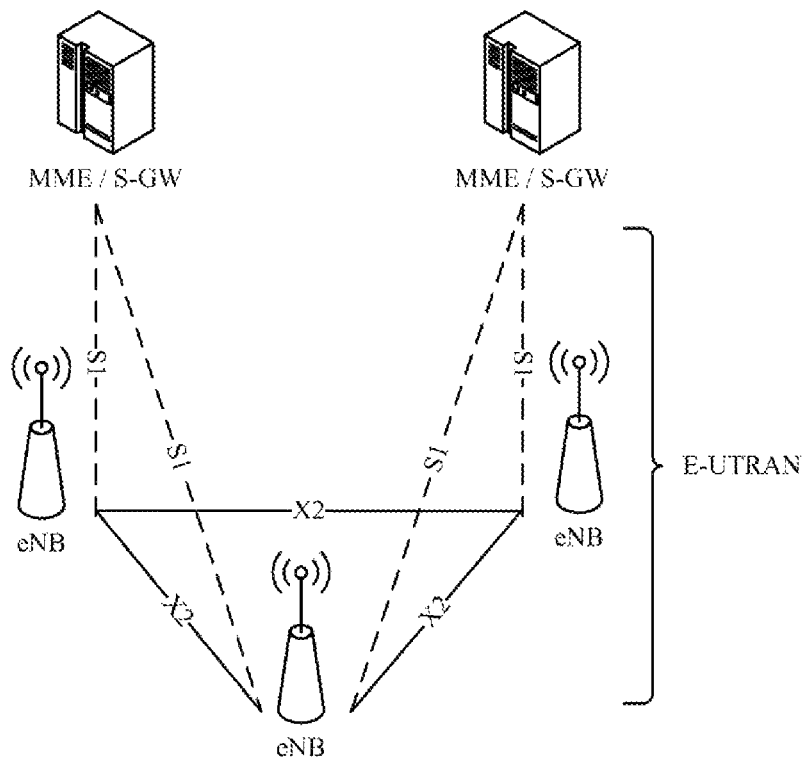
FIG. 1 illustrates a schematic network architectural diagram of the E-UTRAN in the prior art.
Figure 2:
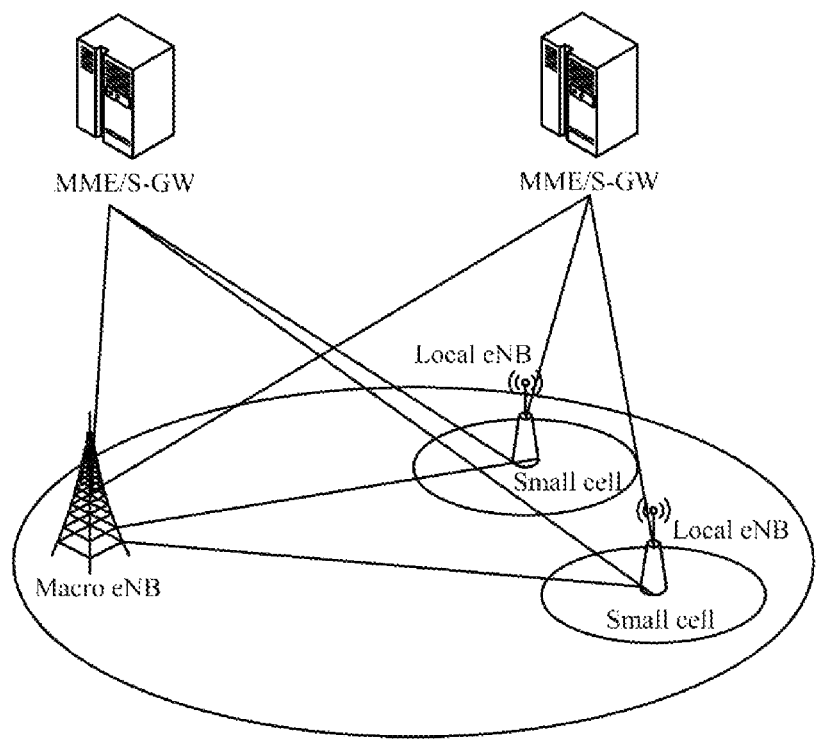
FIG. 2 illustrates a schematic structural diagram of layered network deployment in the prior art.
Figure 3:
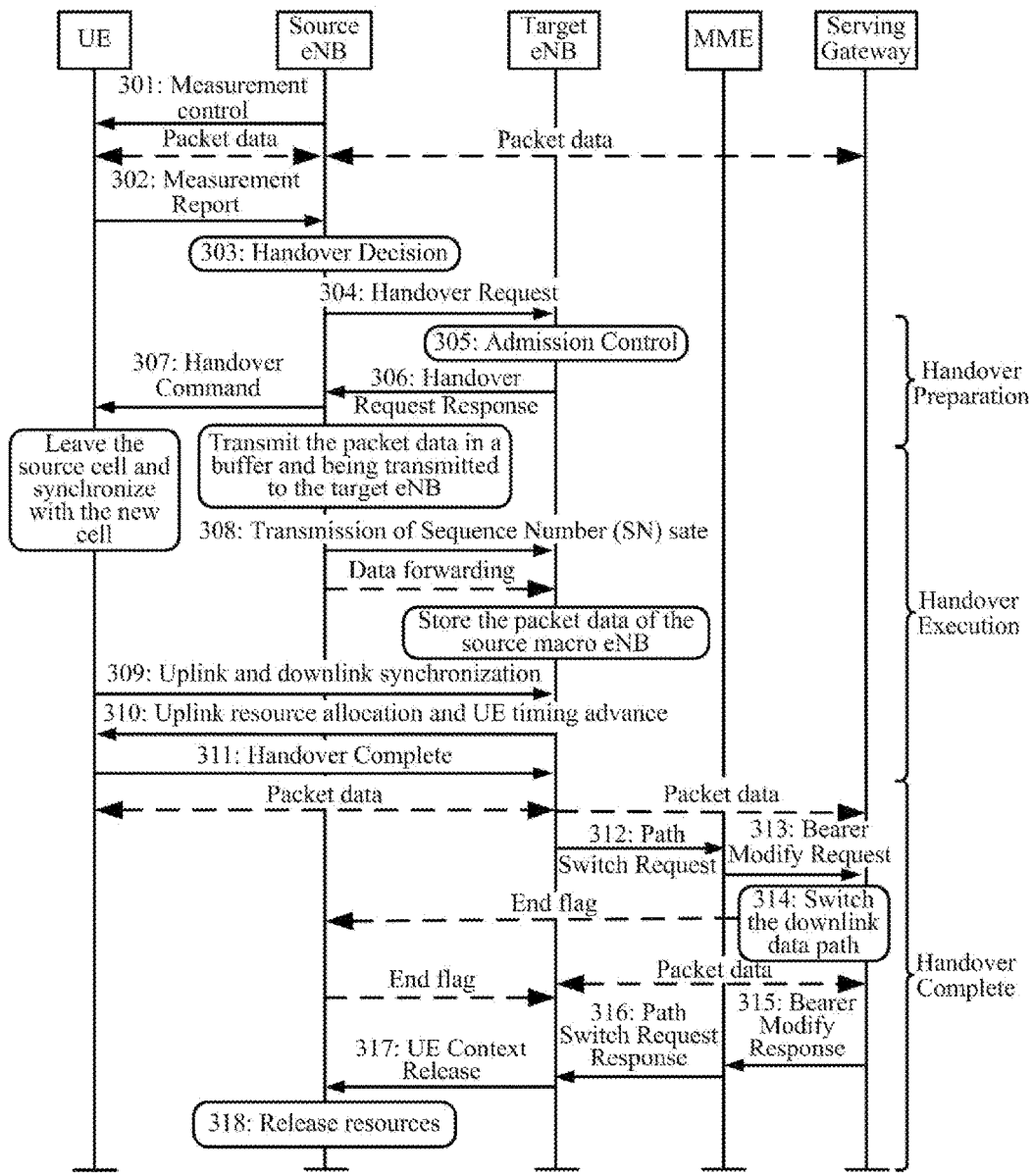
FIG. 3 illustrates a schematic flow chart of the X2 handover process in the LTE system in the prior art.
Figure 4:
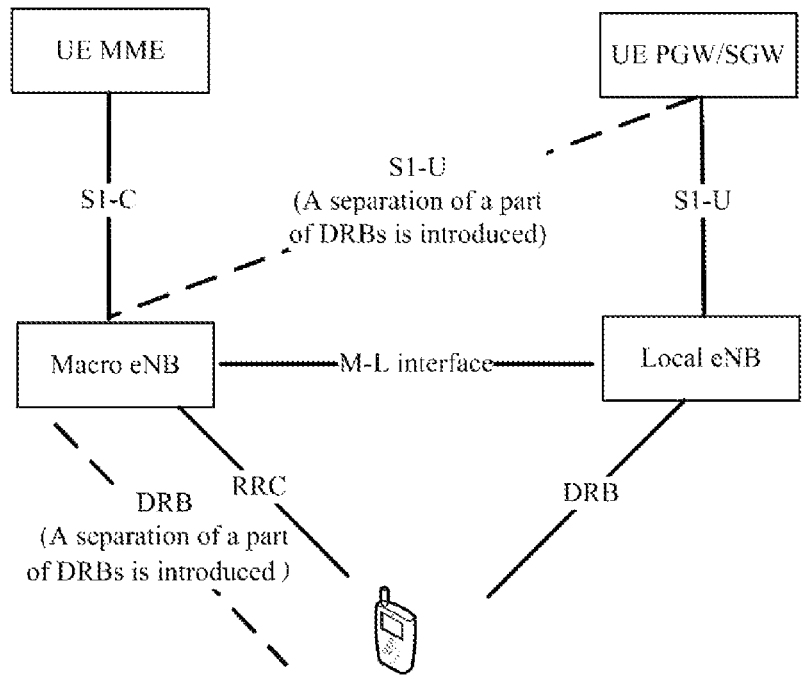
FIG. 4 illustrates a schematic diagram of the first network architecture where bearers are separated.
Figure 5:
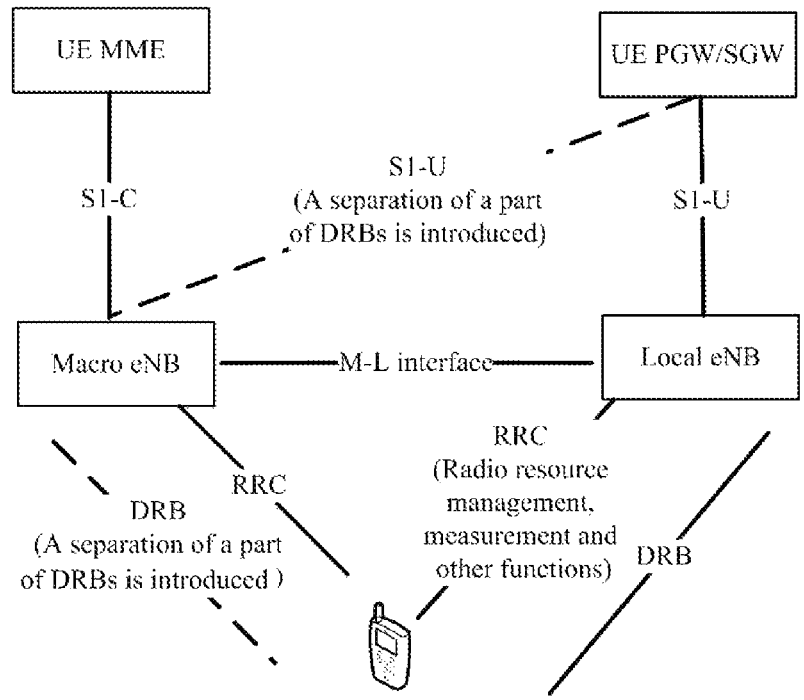
FIG. 5 illustrates a schematic diagram of the second network architecture where bearers are separated.
Figure 6:
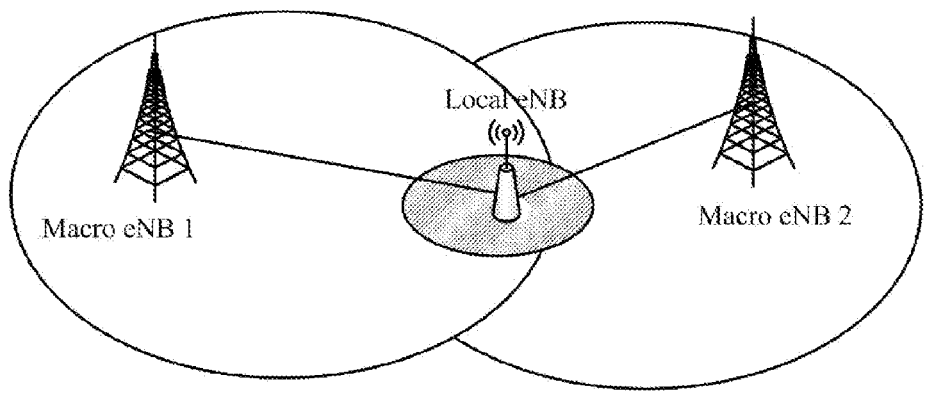
FIG. 6 illustrates a schematic structural diagram of the small cell being deployed in the area where the macro eNBs overlap in the HetNet in the prior art.
Figure 7:
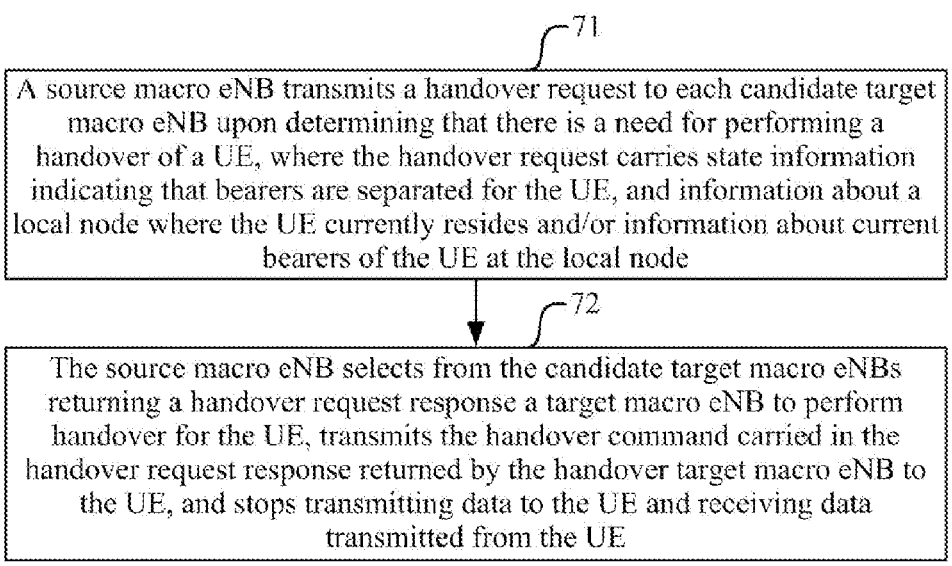
FIG. 7 illustrates a flow chart of a method for performing handover by a source macro eNB in a bear separation scenario according to an embodiment of the invention.

Referring to FIG. 7, for a source macro eNB, a method for performing handover in a bearer separation scenario according to an embodiment of the invention includes the following operations:

Operation 71: A source macro eNB transmits a handover request to each candidate target macro eNB upon determining that there is a need for performing a handover of a UE, where the handover request carries state information indicating that bearers are separated for the UE, and information about a local node where the UE currently resides and/or information about current bearers of the UE at the local node;

Here the source macro eNB can carry the information about the current bearers of the UE at the local node (e.g., Data Radio Bearer (DRB) L2 configuration information) in Access Stratum Configuration (AS-Config) information in handover preparation information included in the handover request; and furthermore the AS-Config information can further carry a current eNB ID, cell ID and/or radio resource configuration and other information of the local node (e.g., a small cell under a local eNB) participating in transmission of a bearer separation service.

Preferably in order to enable the local node to take on transmission of the bearer separation service even after the handover, the source macro eNB carries the same Physical Cell Identifier (PCI) as a candidate handover target in Access Stratum Context (AS-Context) information in the handover preparation information so that the candidate target macro eNB can perform transmission of the bearer separation service with the local node according to the PCI.

Operation 72: The source macro eNB selects from the candidate target macro eNBs returning a handover request response a target macro eNB to perform handover for the UE, receives a handover command, returned by the handover target macro eNB, carrying a bearer separation support acknowledgement message and instructing the UE to perform handover, transmits the handover command carried in the handover request response returned by the handover target macro eNB to the UE, and stops transmitting data to the UE and receiving data transmitted from the UE.

In the embodiment of the invention, in the operation 72, the source macro eNB transmits the handover command returned by the handover target macro eNB to the UE in an RRC Connection Reconfiguration message, where the handover command carries the bearer separation support acknowledgement message.

In the embodiment of the invention, in the operation 72, if the source macro eNB receives the handover request response returned by only one candidate target macro eNB, then the source macro eNB selects the candidate target macro eNB as the target macro eNB to perform the handover; and If the source macro eNB receives the handover request response returned by at least two candidate target macro eNBs, then the source macro eNB selects one of the at least two candidate target macro eNBs as the handover target macro eNB.

Preferably the handover request response returned by the handover target macro eNB carries configuration information for the current bearers of the UE at the present handover target macro eNB, configuration information for the bearers of the UE separated to the local node, respectively of the present handover target macro eNB, and radio link configuration information and/or service cell configuration information of the local node taking on transmission of the bearer separation service, and after the source macro eNB receives the handover request response returned by the handover target macro eNB, the method further includes:

The source macro eNB transmits the configuration information of the handover target macro eNB respectively for the current bearers of the UE on the local node, and the radio link configuration information and/or the service cell configuration information of the local node to the local node.

Preferably the handover request response returned by the handover target macro eNB carries security parameters configured by the handover target macro eNB, and the source macro eNB further transmits the security parameters configured by the handover target macro eNB, carried in the handover request response to the local node so that the local node transmits data using the security parameters configured by the handover target macro eNB.

Preferably the handover command further carries security parameters configured by the handover target macro eNB so that the UE transmits data using the security parameters configured by the handover target macro eNB.

Furthermore after the operation 72, the method further includes:

The source macro eNB releases resource related to the UE upon reception of a UE

Context Release Instruction transmitted by the handover target macro eNB to thereby complete the current handover process.

In the embodiment of the invention, the method further includes:

When the source macro eNB determines that the UE stops transmitting data to the local node and receiving data transmitted by the local node, upon reception of the handover command, the source macro eNB transmits a first notification message to the local node to instruct the local node to stop transmitting data to the UE and receiving data transmitted by the UE.

Here the source macro eNB and the UE make an agreement on whether the UE stops transmitting data to the local node and receiving data transmitted by the local node, upon reception of the handover command; or the source macro eNB instructs the UE and the local node on whether to stop data from being transmitted between the UE and the local node; or the source macro eNB determines upon reception of a third informing message transmitted by the UE that the UE stops transmitting data to the local node and receiving data transmitted by the local node, upon reception of the handover command.

In the embodiment of the invention, before the handover, the UE operates on both the source macro eNB and the local node, and transmits data respectively with the source macro eNB and the local node using security parameters configured by the source macro eNB; and after the UE is handed over successfully to the handover target macro eNB selected by the source macro eNB for the UE, the UE operates on both the handover target macro eNB and the local node, and transmits data respectively with the handover target macro eNB and the local node using the security parameters configured by the handover target macro eNB.

Before the handover, the local node transmits data respectively with the source macro eNB and the UE using the security parameters configured by the source macro eNB; and after the UE is handed over successfully to the handover target macro eNB selected by the source macro eNB for the UE, the local node transmits data respectively with the handover target macro eNB and the UE using the security parameters configured by the handover target macro eNB.

Figure 8:
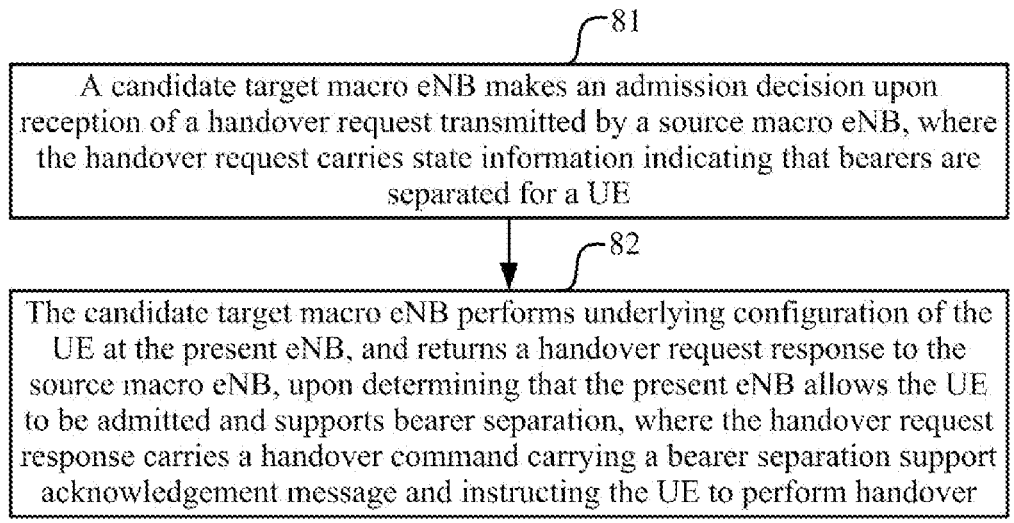
FIG. 8 illustrates a flow chart of a method for performing handover by a target eNB in a bear separation scenario according to an embodiment of the invention.

Further to the embodiment above, for a candidate target macro eNB, a method for performing handover in a bear separation scenario according to an embodiment of the invention includes the following operations as illustrated in FIG. 8:

Operation 81: A candidate target macro eNB makes an admission decision upon reception of a handover request transmitted by a source macro eNB, where the handover request carries state information indicating that bearers are separated for a UE;

The handover request transmitted by the source macro eNB carries the state information indicating that bearers are separated for the UE, and information about a local node where the UE currently resides and/or information about current bearers of the UE at the local node.

Here the candidate target macro eNB makes the admission decision according to Qualities of Service (QoSs), current interference, load conditions, etc., of the bearers to be admitted (i.e., the current bearers of the UE at the source macro eNB) by referring to the handover request transmitted by the source macro eNB.

Operation 82: The candidate target macro eNB performs underlying configuration of the UE at the present eNB, and returns a handover request response to the source macro eNB, upon determining that the present eNB allows the UE to be admitted and supports bearer separation, where the handover request response carries a handover command carrying a bearer separation support acknowledgement message and instructing the UE to perform handover.

Preferably the handover command carries security parameters configured by the candidate target macro eNB.

In the embodiment of the invention, in the operation 82, after the candidate target macro eNB knows from the handover request transmitted by the source macro eNB that bearers are separated for the UE, and information about the local node where the UE currently resides and/or the information about the current bearers of the UE at the local node, the candidate target macro eNB determines whether the candidate target macro eNB supports bearer separation and whether there is a need for updating the separated bearers (for example, the candidate target macro eNB determines whether to adjust the number of bearers at the local node, or to update configuration information of bearers separated to the local node, etc.);

If the candidate target macro eNB supports bearer separation, then the handover request response returned to the source macro eNB carries the bearer separation support acknowledgement message.

In the embodiment of the invention, the underlying configuration, performed by the candidate target macro eNB, of the UE at the present eNB includes: RLC configuration information, MAC configuration information, specific physical layer configuration information (including Physical Downlink Shared Channel (PDSCH) specific configuration and Physical Uplink Control Channel (PUCCH) specific configuration, Physical Uplink Shared Channel (PUSCH) specific configuration, uplink power control specific configuration, etc.), Random Access Channel (RACH) specific configuration information, etc.

Preferably in the operation 82, the handover command in the handover request response returned by the candidate target macro eNB to the source macro eNB carries configuration information of the present eNB respectively for current bearers of the UE at the present eNB (e.g., SRBs and corresponding DRBs), configuration information of bearers of the UE separated to the local node, and radio link configuration information and/or service cell configuration information of the local node taking on transmission of the bearer separation service.

Preferably in the operation 82, the candidate target macro eNB can reselect a local node handover cell for the UE according to the admission measurement decision. After the candidate target macro eNB selects the other local node handover cell, the candidate target macro eNB transmits a handover admission request to the updated local node, where the request message includes the identifier of the UE, and the configuration information of the bearer and the radio resource configuration information of the UE at the original local node, and the target macro eNB adjusts the configuration information of the bearer transmitted at the local node. The updated local node makes an admission decision and feeds back a handover admission request message according to the request message of the target macro eNB, where the feedback information includes the identifier of the UE, and configuration information of the bearer and radio resource configuration information of the UE admitted by the local node. Thereafter the target macro eNB notifies the source macro eNB of the bearer configuration information and the radio resource configuration information of the present eNB for the UE, information about the updated local node to which bearers are separated, the configuration information of the bearer and the radio resource configuration information at the updated local node to which bearers are separated, etc. The source macro eNB can notify the original local node of the handover request feedback information notified by the target macro eNB. Thereafter data carried over those bearers of the original local node which are not acknowledged or transmitted are forwarded from the original local node or the source eNB to the target macro eNB and/or the updated local node.

Preferably if the candidate target macro eNB is a handover target macro eNB selected by the source macro eNB for the UE, then after the handover target macro eNB determines that the handover target macro eNB allows the UE to be admitted, and before the handover target macro eNB returns the handover request response to the source macro eNB, the method further includes:

The handover target macro eNB sets up a dedicated bearer connection with the local node or the updated local node and transmits the configuration information of the present eNB respectively for the current bearers of the UE at the local node, and the radio link configuration information and/or the service cell configuration information of the local node to the local node over the dedicated bearer connection.

Preferably if the local node is changed during the handover, then the handover target macro eNB further notifies the updated local node of information about the original local node including the identifier of the original local node, the bearer configuration information at the original local node, the radio resource configuration information of the original local node, etc. The updated local node subsequently will set up a dedicated bearer connection with the original local node, and receives user data forwarded from the original local node or receives user data obtained by the handover target macro eNB from the source macro eNB or forwarded from the original local node.

Preferably if the local node is changed during the handover, then the source macro eNB notifies the original local node that the local node of the UE is changed upon obtaining a local node change indication notified from the handover target macro eNB, and the original local node stops data from being transmitted and processed with the user.

Preferably the handover target macro eNB further transmits security parameters configured by the present eNB to the local node over the dedicated bearer connection so that the local node transmits data using the security parameters configured by the handover target macro eNB.

Furthermore after the synchronization procedure of the handover target macro eNB with the UE is completed, the method further includes:

The handover target macro eNB transmits uplink resource allocation and timing synchronization information to the UE;

The handover target macro eNB performs uplink/downlink transmission of data with the UE, and transmits a Path Switch Request to a Core Network (CN), upon reception of a Handover Completion message returned by the UE;

The handover target macro eNB transmits a UE Context Release instruction to the source macro eNB upon reception of a Path Switch Request Response returned by the core network so that the source macro eNB releases corresponding resources to thereby complete the current handover process.

In the embodiment of the invention, the method further includes:

The handover target macro eNB transmits a first instruction message to the local node upon reception of a Transmission Resume Request transmitted by the UE to instruct the local node to resume transmission of data to the UE and reception of data transmitted by the UE.

Figure 9:
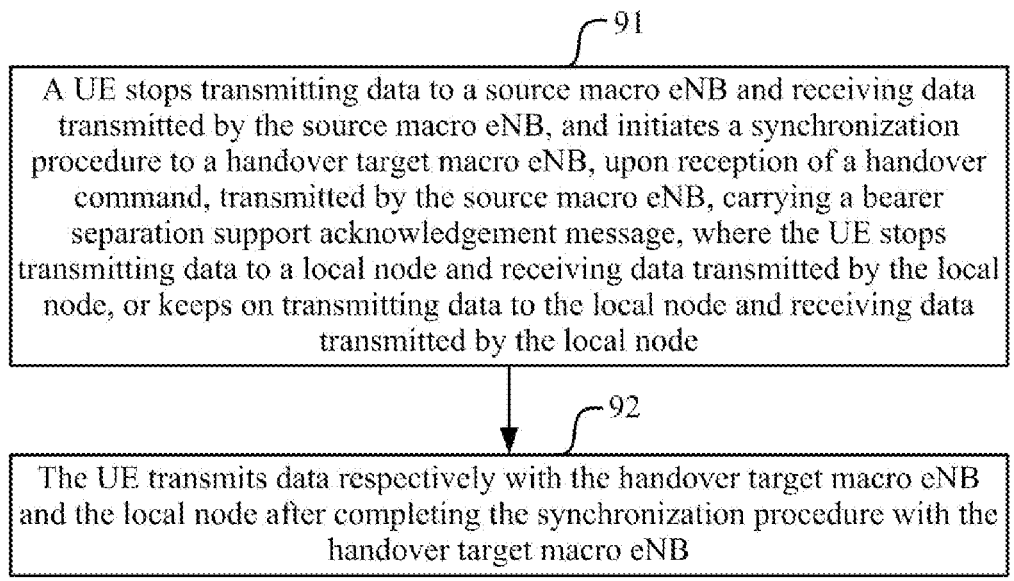
FIG. 9 illustrates a flow chart of a method for performing handover by a UE in a bear separation scenario according to an embodiment of the invention.

Further to the embodiment above, for the UE, a method for performing handover in a bearer separation scenario according to an embodiment of the invention includes the following operations as illustrated in FIG. 9:

Operation 91: A UE stops transmitting data to a source macro eNB and receiving data transmitted by the source macro eNB, and initiates a synchronization procedure to a handover target macro eNB, upon reception of a handover command, transmitted by the source macro eNB, carrying a bearer separation support acknowledgement message, where the UE stops transmitting data to a local node and receiving data transmitted by the local node, or keeps on transmitting data to the local node and receiving data transmitted by the local node.

Operation 92: The UE transmits data respectively with the handover target macro eNB and the local node after completing the synchronization procedure with the handover target macro eNB.

Here the UE is synchronized with the handover target macro eNB as follows:

The UE initiates a Random Access (RA) procedure to the handover target macro eNB after completing downlink synchronization;

The handover target macro eNB returns an RACH Response message, carrying a TA value adjusted by the present eNB and other information, to the UE upon reception of a preamble;

The UE acknowledges a handover success by returning a handover completion message (i.e., RRC reconfiguration complete message) to the handover target macro eNB;

Upon reception of the handover completion message, the handover target macro eNB returns an RLC ACK message to the UE, and also begins transmitting downlink data, transmits a Path Switch Request to a core network, and instructs the source macro eNB to release bearers related to the UE and a context of the UE, upon reception of a Path Switch Request Response transmitted by the core network; and The UE transmits data with the handover target macro eNB upon reception of the ACK message, and at this time the UE for which bearers are separated operates at both the handover target macro eNB and the local node.

Preferably in order to guarantee a lossless operation on data in an Acknowledged Mode (AM), the source macro eNB forwards data of the UE, which have not been acknowledged or newly received, to the handover target macro eNB.

Furthermore in the operation 91, when the UE stops transmitting data to the source macro eNB and receiving data transmitted by the source macro eNB, there are two approaches for data transmission between the UE and the local node as follows:

In a first approach, the UE stops transmitting data to the local node and receiving data transmitted by the local node until the UE is resynchronized successfully with the local node, and resumes transmission of data to the local node and reception of the data transmitted by the local node; and Preferably the method further includes:

The UE transmits a second informing message to the local node to instruct the local node to stop transmitting data to the UE and receiving data transmitted by the UE; or the UE transmits a third informing message to the source macro eNB to instruct the source macro eNB to notify the local node to stop transmitting data to the UE and receiving data transmitted by the UE; and Correspondingly upon reception of the third informing message transmitted by the UE, the source macro eNB determines that the UE stops transmitting data to the local node and receiving data transmitted by the local node, upon reception of the handover command, and transmits the first notification message to the local node to instruct the local node to stop transmitting data to the UE and receiving data transmitted by the UE.

Furthermore after the synchronization of the UE with the handover target macro eNB is completed and feeds a handover completion message back to the handover target macro eNB (that is, after the UE feeds the handover completion message back to the handover target macro eNB), the method further comprises:

The UE initiates a synchronization procedure to the local node, where the UE transmits data using security parameters configured by the handover target macro eNB in the synchronization procedure with the local node; and If the UE is synchronized successfully with the local node, then the UE transmits a Transmission Resume Request to the handover target macro eNB; and correspondingly the handover target macro eNB transmits a first instruction message to the local node to instruct the local node to resume transmission of data to the UE and reception of data transmitted by the UE to thereby resume transmission of data between the UE and the local node, and at this time both the UE and the local node transmit data to each other using the security parameters configured by the handover target macro eNB.

If the UE is synchronized unsuccessfully with the local node, then the UE transmits a fifth instruction message to the handover target macro eNB to indicate the unsuccessful synchronization with the local node.

Preferably if the local node is changed during the handover, then the UE knows from the handover command that the local node is changed, or the UE stops data from being transmitted with the source macro eNB and the local node directly upon reception of the handover command, and the UE performs synchronization with the handover target macro eNB and the updated local node. Furthermore after the synchronization of the UE with the updated local node is completed, the UE or the updated local node notifies the handover target macro eNB that the user has been synchronized with the local node and data transmission can be performed subsequently.

In a second approach, the UE keeps on transmitting data to the local node and receiving data transmitted by the local node.

In the handover process in this approach, the method further includes:

The UE decodes data transmitted by the local node using the security parameters configured by the source macro eNB and the security parameters configured by the handover target macro eNB respectively; and The UE stops decoding using the security parameters configured by the source macro eNB after successful decoding using the security parameters configured by the handover target macro eNB.

In this approach, since the local node is not changed before and after the handover between the macro eNBs, and data of the UE at the local node has not been stopped from being transmitted, preferably the handover command further carries information to instruct the local node not to forward data of the UE at the local node.

In this approach, data of the UE, for which bearers are separated, at the local node can be kept on being transmitted throughout the handover process to thereby lower a delay due to an interruption of the data so as to significantly improve an experience of a user while high-rate data are being transmitted in a heterogeneous network.

Figure 10:
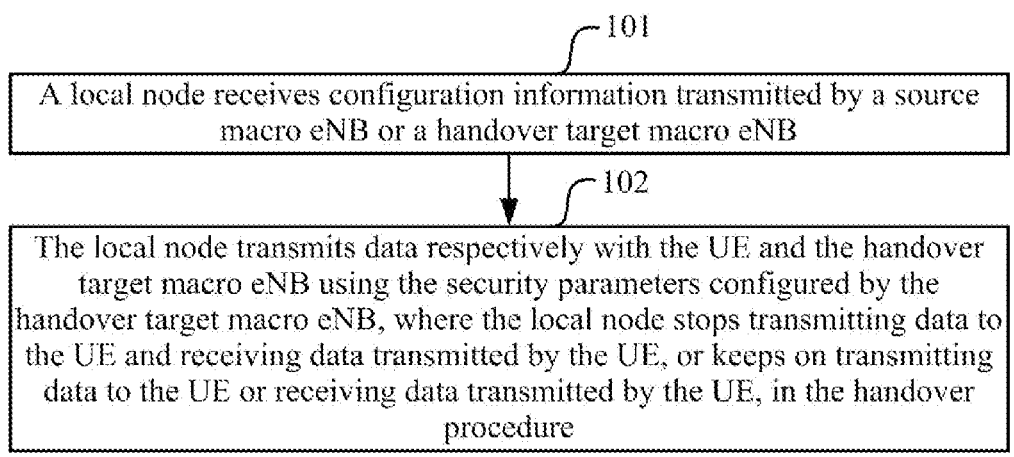
FIG. 10 illustrates a flow chart of a method for performing handover by a local node in a bear separation scenario according to an embodiment of the invention.

Further to the embodiment above, for a local node, a method for performing handover in a bearer separation scenario according to an embodiment of the invention includes the following operations as illustrated in FIG. 10:

Operation 101: A local node receives configuration information transmitted by a source macro eNB or a handover target macro eNB;

Here the configuration information includes at least configuration information of the handover target macro eNB respectively for current bearers of a UE on the present node, radio link configuration information of the present node, and security parameters configured by the handover target macro eNB; and Operation 102: The local node transmits data respectively with the UE and the handover target macro eNB using the security parameters configured by the handover target macro eNB, where the local node stops transmitting data to the UE and receiving data transmitted by the UE, or keeps on transmitting data to the UE or receiving data transmitted by the UE, in the handover procedure.

Furthermore the method further includes:

The local node stops transmitting data to the UE and receiving data transmitted by the UE, upon reception of a first notification message transmitted by the source macro eNB or a second informing message transmitted by the UE; and The local node resumes transmission of data to the UE and reception of data transmitted by the UE upon reception of a first instruction message transmitted by the handover target macro eNB.

The local node according to the embodiment of the invention includes but will not be limited to one of:

A local eNB, a lower-power (pico) eNB, a home (femto) eNB, a Remote Radio Head (RRH), a repeater, a Relay Node (RN), etc.

Figure 11:
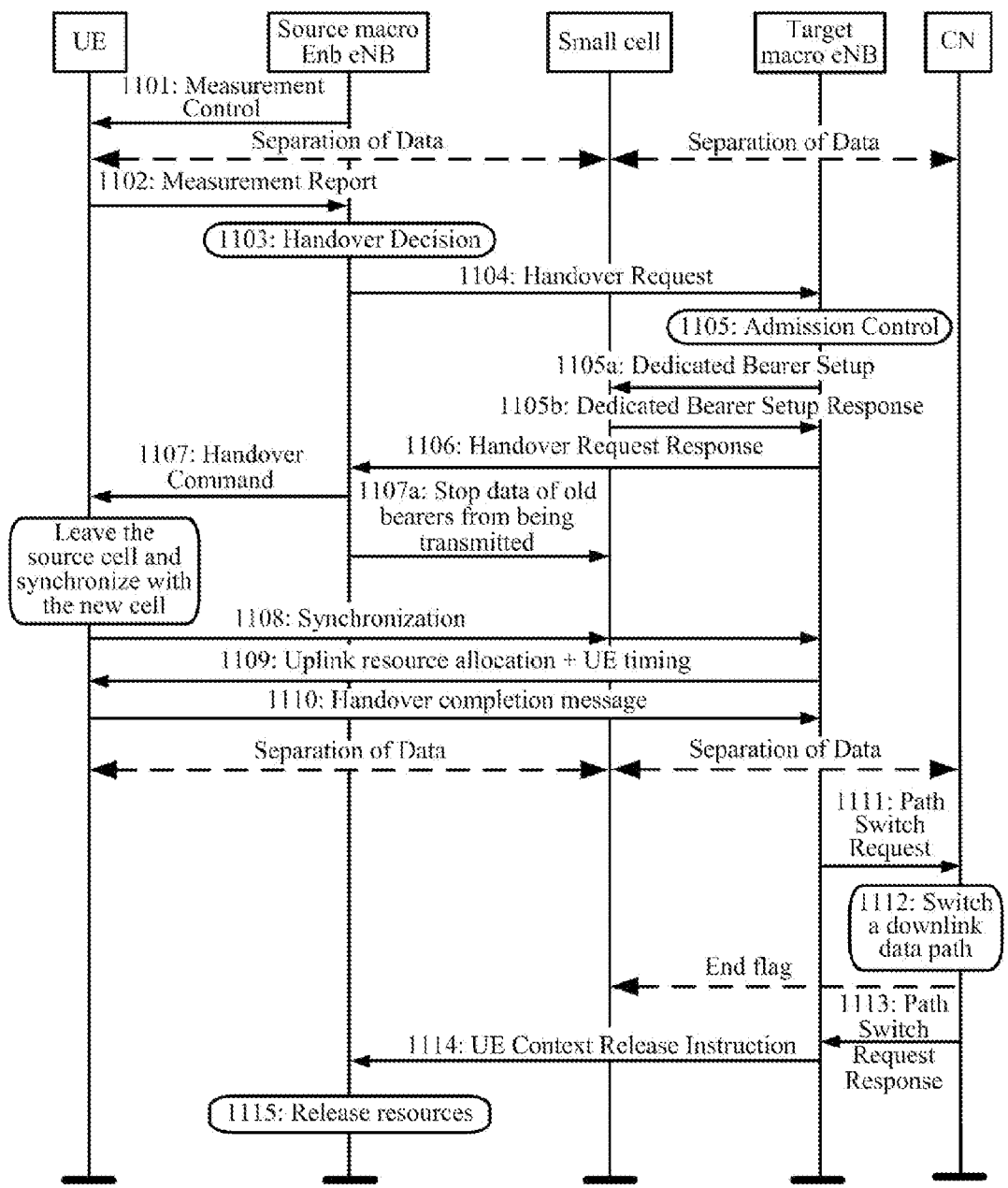
FIG. 11 illustrates an interaction flow chart of a handover process in a first application scenario according to an embodiment of the invention.

The handover process above will be described below in details in connection with two application scenarios:

First Embodiment in this embodiment, a UE is handed over from a source macro eNB to a target macro eNB, and the UE stops transmitting data to a local node (a small cell in this embodiment) and receiving data transmitted by the local node upon reception of a handover command transmitted by the source macro eNB. Referring to FIG. 11, the source macro eNB, the target macro eNB, the UE and the small cell interact as follows in this embodiment:

Operation 1101: A source macro eNB performs measurement control on a UE in a Measurement Configuration IE in RRC Connection Reconfiguration;

Operation 1102: The UE reports a measurement result to the source macro eNB;

Operation 1103: The source macro eNB makes a handover decision according to the measurement result reported by the UE;

Operation 1104: The source macro eNB transmits a handover request to a target macro eNB upon determining that there is a need for performing handover of the UE;

Operation 1105: The target macro eNB performs admission control;

Operation 1105a: The target macro eNB initiates a Dedicated Bearer Setup procedure to a Small Cell;

Operation 1105b: The Small Cell returns a Dedicated Bearer Setup Response to the target macro eNB;

Operation 1106: The target macro eNB transmits a Handover Request Response to the source macro eNB upon determining that the target macro eNB allows the UE to be admitted and supports bearer separation, where the Handover Request Response carries a handover command carrying a bearer separation support acknowledgement message and instructing the UE to perform handover;

Operation 1107: The source macro eNB transmits the handover command to the UE;

Correspondingly the UE stops transmitting data to the source macro eNB and the Small Cell and receiving data transmitted by the source macro eNB and the Small Cell, upon reception of the handover command;

Operation 1107a: The source macro eNB instructs the small cell Small Cell to stop data of old bearers from being transmitted, that is, stops transmitting data to the UE and receiving data transmitted by the UE;

Operation 1108: The UE initiates a synchronization procedure to the target macro eNB upon reception of the handover command;

Furthermore the UE triggers a synchronization procedure UE with the Small Cell after completing the synchronization with the target macro eNB (in the procedure, the UE transmits data using security parameters configured by the target macro eNB);

Operation 1109: The target macro eNB transmits uplink resource allocation and timing synchronization information to the UE;

Operation 1110: The UE returns a handover completion message to the target macro eNB to acknowledge a successful handover;

At this time the UE for which bearers are separated operates at both the Small Cell and the target macro eNB;

Operation 1111: The target macro eNB transmits a Path Switch Request to a Core Network (CN);

Operation 1112: The CN switches a downlink data path;

Operation 1113: The CN returns a Path Switch Request Response to the target macro eNB;

Operation 1114: The target macro eNB transmits a UE Context Release Instruction to the source macro eNB; and Operation 1115: The source macro eNB releases the corresponding resources.

Figure 12:
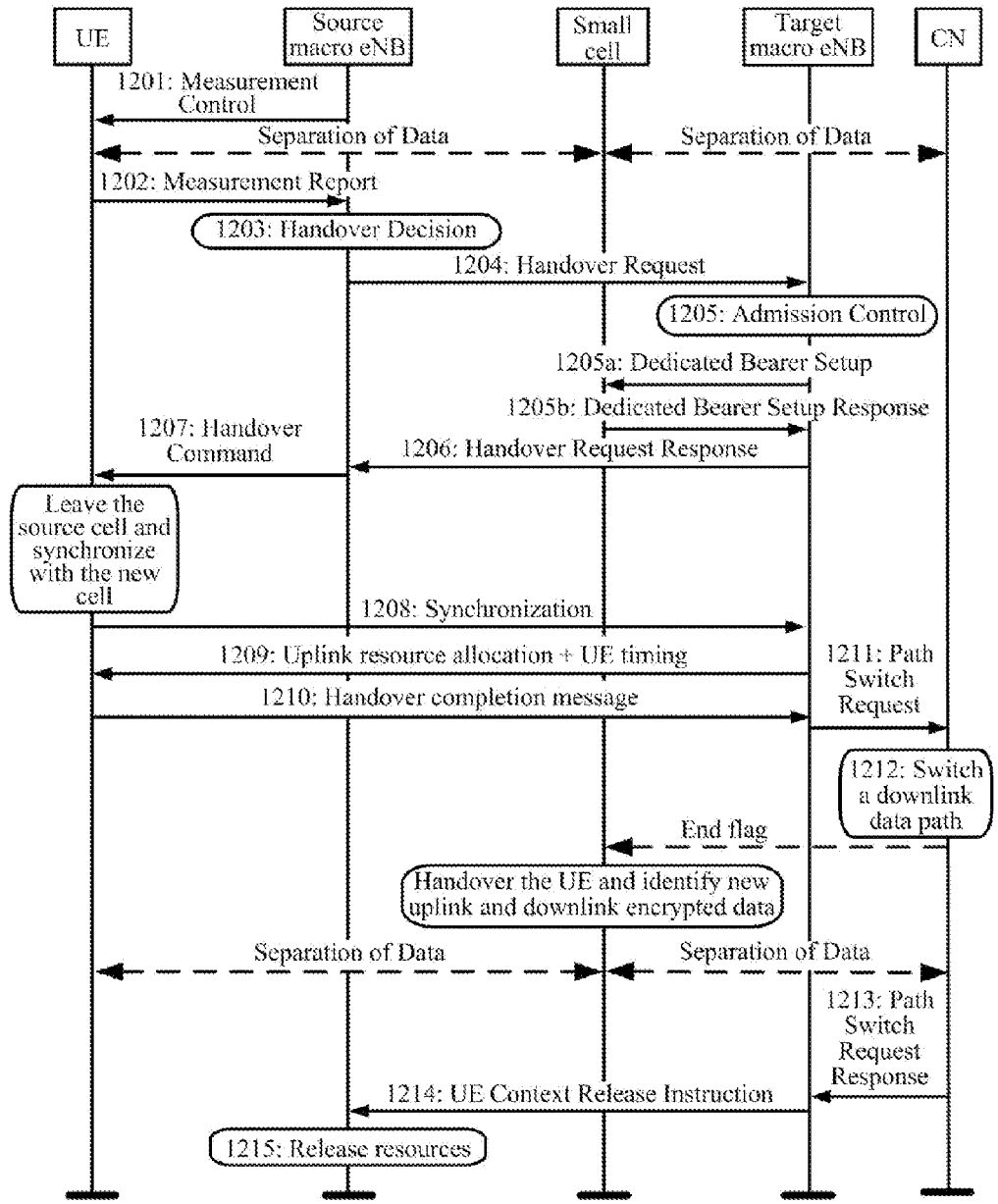
FIG. 12 illustrates an interaction flow chart of a handover process in a second application scenario according to an embodiment of the invention.

Second Embodiment in this embodiment, a UE is handed over from a source macro eNB to a target macro eNB, and the UE keeps on transmitting data to a local node (a Small Cell in this embodiment) and receiving data transmitted by the local node upon reception of a handover command transmitted by the source macro eNB. Referring to FIG. 12, the source macro eNB, the target macro eNB, the UE and the Small Cell interact as follows in this embodiment:

Operation 1201: A source macro eNB performs measurement control on a UE;

Operation 1202: The UE reports a measurement result to the source macro eNB;

Operation 1203: The source macro eNB makes a handover decision according to the measurement result reported by the UE;

Operation 1204: The source macro eNB transmits a handover request to a target macro eNB upon determining that there is a need for performing handover of the UE;

Operation 1205: The target macro eNB performs admission control;

Operation 1205a: The target macro eNB initiates a Dedicated Bearer Setup procedure to a small cell;

Operation 1205b: The Small Cell returns a Dedicated Bearer Setup Response to the target macro eNB;

Operation 1206: The target macro eNB transmits a Handover Request Response to the source macro eNB upon determining that the target macro eNB allows the UE to be admitted and supports bearer separation, where the Handover Request Response carries a handover command carrying a bearer separation support acknowledgement message and instructing the UE to perform handover;

Operation 1207: The source macro eNB transmits the handover command to the UE;

Correspondingly the UE stops transmitting data from to the source macro eNB and receiving data transmitted by the source macro eNB, and keeps on transmitting data to the small cell and receiving data transmitted by the small cell, upon reception of the handover command;

Operation 1208: The UE initiates a synchronization procedure to the target macro eNB upon reception of the handover command;

Operation 1209: The target macro eNB transmits uplink resource allocation and timing synchronization information to the UE;

Operation 1210: The UE returns a handover completion message to the target macro eNB to acknowledge a successful switch;

At this time the UE for which bearers are separated operates at both the small cell and the target macro eNB;

Operation 1211: The target macro eNB transmits a Path Switch Request to a Core Network (CN);

Operation 1212: The CN switches a downlink data path;

Operation 1213: The CN returns a Path Switch Request Response to the target macro eNB;

Operation 1214: The target macro eNB transmits a UE Context Release Instruction to the source macro eNB; and Operation 1215: The source macro eNB releases corresponding resources.

In this application scenario, since the UE still keeps on transmitting data with the local node in the handover procedure, the UE needs to store security parameters configured by the source macro eNB and security parameters configured by the target macro eNB, and decodes using the two sets of security parameters respectively until a PDCP package using new security parameters (i.e., the security parameters configured by the target macro eNB) is decoded, and then decodes using the new security parameters. In this application scenario, the small cell encrypts data transmitted to the UE using only the new security parameters after an end flag is received, i.e., the illustrated operation of "Handover the UE and identify new uplink and downlink encrypted data".

Generally the following two exceptional situations may occur in the handover procedure according to the embodiment of the invention:

In a first exceptional situation, there is a failure in handover at the network side (that is, the UE fails to be synchronized with the handover target macro eNB); and In a second exceptional situation, there is a successful handover at the network side, and there is a failure in synchronization with the local node (that is, the UE fails to be synchronized with the local node), where there is such an application scenario of the exceptional situation that the UE stops transmitting data to the local node and receiving data transmitted by the local node, upon reception of the handover command transmitted by the source macro eNB;

In this embodiment, the first exceptional situation is determined in the following two approaches:

In a first approach, the source macro eNB determines whether there is a failure in handover at the network side particularly as follows:

The source macro eNB starts a first timer after receiving the Handover Request Response returned by each candidate target macro eNB or selecting the handover target macro eNB for the UE;

If the source macro eNB has not receive any UE Context Release Instruction transmitted by the handover target macro eNB when the first timer expires, then a failure in handover at the network side is determined;

The source macro eNB transmits a second notification message to the local node to instruct the local node to operate correspondingly according to the second notification message; and The source macro eNB transmits a third notification message to the UE to indicate the failure in handover of the UE at the network side to instruct the UE to perform a reestablishment procedure upon reception of the third notification message, where the reestablishment target macro eNB is the same eNB as the target macro eNB where the handover fails.

In this approach, for the local node, the local node determines a failure in handover at the network side, and operates correspondingly according to the second notification message, upon reception of the second notification message transmitted by the source macro eNB, particularly in the following two situations:

In a first situation, the second notification message is configured to instruct the local node to stop transmitting data to the UE and receiving data transmitted by the UE; and Correspondingly the local node stops transmitting data to the UE and receiving data transmitted by the UE, and releases bearer configuration related to the UE; and Furthermore the local node buffers data, related to the UE, which have not been processed or transmitted, upon reception of the second notification message.

Furthermore if the UE keeps on transmitting data to the local node and receiving data transmitted by the local node upon reception of the handover command transmitted by the source macro eNB, then the local node further notifies the UE to stop transmitting data to the present node and receiving data transmitted by the present node, upon reception of the second notification message.

In a second situation, the second notification message is configured to indicate a failure in handover at the network side;

Correspondingly the local node keeps on transmitting data to the UE and receiving data transmitted by the UE and starts a fourth timer; and if the local node has not received any instruction from the reestablishment target macro eNB when the fourth timer expires, then the local node stops transmitting data from to the UE and receiving data transmitted by the UE, and releases resource configuration related to the UE.

Furthermore if the local node receives the second notification message transmitted by the reestablishment target macro eNB before the fourth timer expires, then the local node forwards data to be transmitted between the local node and the UE to the reestablishment target macro eNB; and If the reestablishment target macro eNB initiates a bearer separation procedure to the local node before the fourth timer expires, then the local node updates its resource configuration, and resumes transmitting data to the UE and receiving data transmitted by the UE, after completing the bearer separation procedure with the reestablishment target macro eNB.

It shall be noted that the length of time of the fourth timer can be configured by the local node or can be configured by the source macro eNB; and moreover the fourth timer can alternatively be triggered by the source macro eNB to be started.

In this approach, for the UE, the UE determines a failure in handover at the network side, and initiates a reestablishment procedure to the reestablishment target macro eNB, upon reception of the third notification message transmitted by the source macro eNB.

Preferably the UE suspends bearers, which have not been separated to the local node, other than the SRB0, and performs a cell selection procedure, in the reestablishment procedure with the reestablishment target macro eNB; and If the reestablishment procedure succeeds, then the UE transmits data respectively with the reestablishment target macro eNB and the local node, and If the reestablishment procedure fails, then the UE stops transmitting data to the local node and receiving data transmitted by the local node, releases its RRC connection with the reestablishment target macro eNB, and enters an idle (RRC_IDLE) state.

Furthermore the UE further transmits a fourth informing message to the local node to indicate to the local node the failure of the reestablishment procedure, upon determining the failure of the reestablishment procedure.

The reestablishment procedure of the UE with the reestablishment target macro eNB includes the following operations as described below in details:

The UE starts a T311 timer;

The UE suspends bearers, which have not been separated to the local node, other than the SRB0, and performs a cell selection procedure;

After the UE selects an appropriate reestablishment cell (e.g., a TD-LTE cell), the UE stops the T311 timer and starts a T301 timer, and transmits an RRC Connection Reestablishment Request message to the reestablishment target macro eNB;

The UE stops the T301 timer upon reception of an RRC Connection Reestablishment message returned by the reestablishment target macro eNB; and The UE establishes a PDCP entity and an RLC entity corresponding to the SRB1 on the reestablishment cell, resumes transmission of the SRB1, and transmits an RRC Connection Reestablishment Complete message to the reestablishment target macro eNB to thereby complete the reestablishment procedure with the reestablishment target macro eNB; and at this time the UE for which bearers are separated operates at both the local node and the reestablishment target macro eNB (i.e., the original target macro eNB where the handover fails).

Preferably the reestablishment target macro eNB adjusts the separated RBs and their configuration, and updates the security parameters in use, after performing the reestablishment procedure.

Furthermore in the reestablishment procedure, if the UE has not select any appropriate reestablishment cell when the T311 timer expires, then a failure of the reestablishment procedure is determined; or If the UE has not received any RRC Connection Reestablishment message returned by the reestablishment target macro eNB when the T301 timer expires, then a failure of the reestablishment procedure is determined; or If the UE receives an RRC Connection Reestablishment Reject message transmitted by the reestablishment target macro eNB, then a failure of the reestablishment procedure is determined.

Furthermore after the UE determines the failure of the reestablishment procedure, the UE releases its RRC connection and enters an RRC_IDLE state.

Figure 13:
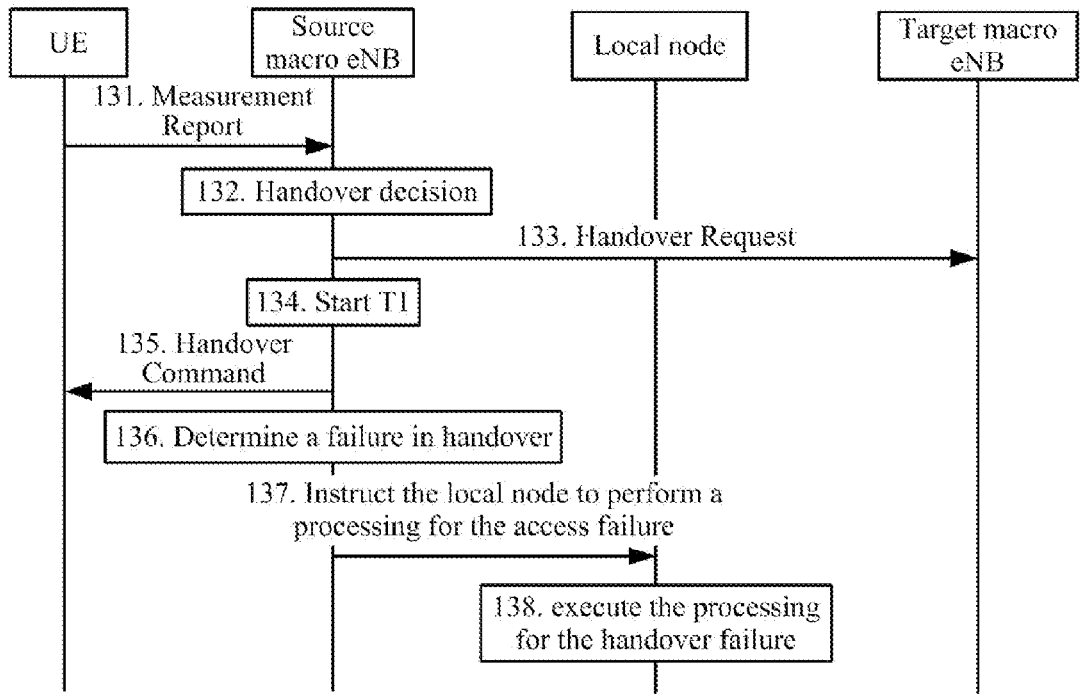
FIG. 13 illustrates an interaction flow chart between respective devices in a first approach according to an embodiment of the invention.

The interaction between the UE, the source macro eNB, the local node and the target macro eNB in the first approach will be described below in details in connection with a particular embodiment illustrated in FIG. 13, and an interaction process for the UE to be handed over from the source macro eNB to the target macro eNB in this embodiment is as follows:

Operation 131: The UE reports a measurement result to the source macro eNB;

Operation 132: The source macro eNB makes a handover decision according to the measurement result reported by the UE;

Operation 133: The source macro eNB transmits a handover request to the target macro eNB upon determining that there is a need for performing handover;

Operation 134: The source macro eNB starts a configured timer T1 upon reception of a Handover Request Response returned by the target macro eNB to determine whether there is a failure in handover at the network side;

Operation 135: The source macro eNB transmits a handover command to the UE;

Operation 136: If the source macro eNB has not received any UE Context Release instruction transmitted by the target macro eNB when the timer T1 expires, then a failure in handover at the network side is determined;

Operation 137: The source macro eNB notifies the local node of the failure in handover at the network side and instructs the local node to perform a processing for the failure in handover;

Operation 138: The local node executes the process for the failure in handover, for example, by stopping transmitting data to the UE and receiving data transmitted by the UE; and buffering data, related to the UE, which have not been processed or transmitted, so that the UE continues the transmission of the data after the reestablishment; and in another example, by keeping on transmitting data to the UE and receiving data transmitted by the UE, starting a configured timer T2, and if the UE has not received any instruction from the reestablishment target macro eNB when the timer T2 expires, stopping transmitting data to the UE and receiving data transmitted by the UE; etc.

In a second approach, The UE determines whether there is a failure in handover at the network side particularly as follows:

The UE determines a failure in handover at the network side, and initiates an establishment procedure to the reestablishment target macro eNB, upon determining a failure of a Random Access (RA) to the reestablishment switch target macro eNB; or The UE starts a configured third timer (e.g., a T304 timer) while initiating a synchronization procedure to the reestablishment switch target macro eNB, and if the UE has not received any feedback information from the reestablishment switch target macro eNB when the third timer expires, then the UE determines a failure in handover at the network side and initiates an establishment procedure to the reestablishment target macro eNB;

Where the reestablishment target macro eNB is the same eNB as the target macro eNB where the handover fails.

In this approach, if the UE stops transmitting data from to the source macro eNB and the local node and receiving data transmitted by the source macro eNB and the local node upon reception of the handover command transmitted by the source macro eNB, then the UE further transmits a first informing message to the local node to indicate to the local node the failure in handover at the network side, upon determining the failure in handover at the network side; and Correspondingly since the local node has stopped transmitting data to the UE and receiving data transmitted by the UE, the local node releases bearer configuration related to the UE upon reception of the first informing message; and Furthermore the local node buffers data, related to the UE, which have not been processed or transmitted, upon reception of the first informing message so that the UE continues the transmission of the data after the reestablishment.

If the UE stops transmitting data to the source macro eNB and receiving data transmitted by the source macro eNB, and keeps on transmitting data to the local node and receiving data transmitted by the local node, upon reception of the handover command transmitted by the source macro eNB, then the UE further stops transmitting data from to the local node and receiving data transmitted by the local node, and transmits a first informing message to the local node to indicate to the local node the failure in handover at the network side, upon determining the failure in handover at the network side; and Correspondingly since the local nodes currently still keeps on transmitting data to the UE and receiving data transmitted by the UE, the local node stops transmitting data to the UE and receiving data transmitted by the UE, and releases bearer configuration related to the UE, upon reception of the first informing message; and Furthermore the local node buffers data, related to the UE, which have not been processed or transmitted, upon reception of the first informing message so that the UE continues the transmission of the data after the reestablishment.

In this approach, the UE initiates the reestablishment procedure to the reestablishment target macro eNB upon determining a failure in handover at the network side, and the local node operates, as described in the first approach, so a repeated description thereof will be omitted here.

Figure 14:
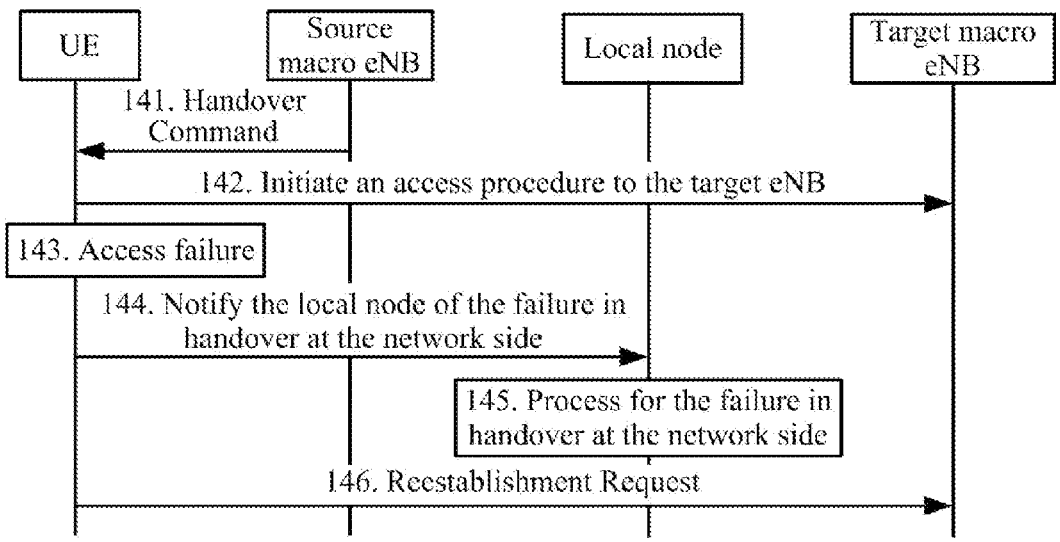
FIG. 14 illustrates an interaction flow chart between respective devices in a second approach according to an embodiment of the invention.

The interaction between the UE, the source macro eNB, the local node and the target macro eNB in the second approach will be described below in details in connection with a particular embodiment illustrated in FIG. 14, and an interaction process for the UE to be handed over from the source macro eNB to the target macro eNB in this embodiment is as follows:

Operation 141: The source macro eNB transmits a handover command to the UE;

Operation 142: The UE initiates a random access procedure to the target macro eNB upon reception of the handover command;

Operation 143: The UE determines a failure in handover at the network side;

Operation 144: The UE notifies the local node of the failure in handover at the network side;

Operation 145: The local node executes a process for the failure in handover at the network side, for example, by stopping transmitting data to the UE and receiving data transmitted by the UE; by releasing bearer configuration corresponding to the UE; by buffering data, related to the UE, which have not been processed or transmitted; etc.; and Operation 146: The UE initiates a reestablishment request to the reestablishment target macro eNB referring to the related description in the first approach, so a repeated description thereof will be omitted here.

In this embodiment, the second exceptional situation is determined in the following two approaches:

In an approach A, the UE determines whether there is a failure in the synchronization of the UE with the local node particularly as follows:

The UE initiates a synchronization procedure to the local node after completing the synchronization procedure of the UE with the handover target macro eNB; and If the synchronization with the local node succeeds, then the UE transmits a Transmission Resume Request to the handover target macro eNB, and If the synchronization with the local node fails, then the UE transmits a fifth informing message to the handover target macro eNB to indicate a failure in synchronization with the local node.

Correspondingly if the handover target macro eNB receives the Transmission Resume Request returned by the UE, then the handover target macro eNB transmits a first instruction message to the local node to instruct the local node to resume transmission of data to the UE and reception of data transmitted by the UE; and If the handover target macro eNB receives the fifth informing message returned by the UE, then the handover target macro eNB reselects a local node to which bearers are separated, and after the handover target macro eNB selects another local node handover cell, the handover target macro eNB transmits a handover admission request to the updated local node, where the request message includes the identifier of the UE, and the bearer configuration information and the radio resource configuration information of the UE at the original local node, and the target macro eNB adjusts the bearer configuration information transmitted at the local node and the handover target macro eNB further notifies the updated local node of the information about the original local node including the identifier of the original local node, the bearer configuration information on the original local node, the radio resource configuration information of the original local node, etc. The updated local node makes an admission decision and feeds back a handover admission request message according to the request message of the handover target macro eNB, where the feedback information includes the identifier of the UE, and the bearer configuration information and the radio resource configuration information of the UE admitted at the local node. Thereafter the handover target macro eNB transmits the bearer configuration information and the radio resource configuration information of the present eNB for the UE, the information about the updated located node to which bearers are separated, the bearer configuration information and the radio resource configuration information separated on the local node, etc., to the source macro eNB in a fifth informing message to instruct the source macro eNB to notify the local node, where the synchronization fails, to release the bearer configuration related to the UE and to notify the local node, where the synchronization fails, to transmit its buffered data related to the UE to the handover target macro eNB; or the handover target macro eNB reselects a local node to which bearers are separated and to notify the local node, where the synchronization fails, to release the bearer configuration related to the UE and to notify the local node, where the synchronization fails, to transmit its buffered data related to the UE to the present eNB. The updated local node subsequently will set up a dedicated bearer connection with the original local node, and receives user data forwarded from the original local node or receives user data obtained by the handover target macro eNB from the source macro eNB or forwarded from the original local node.

Figure 15:
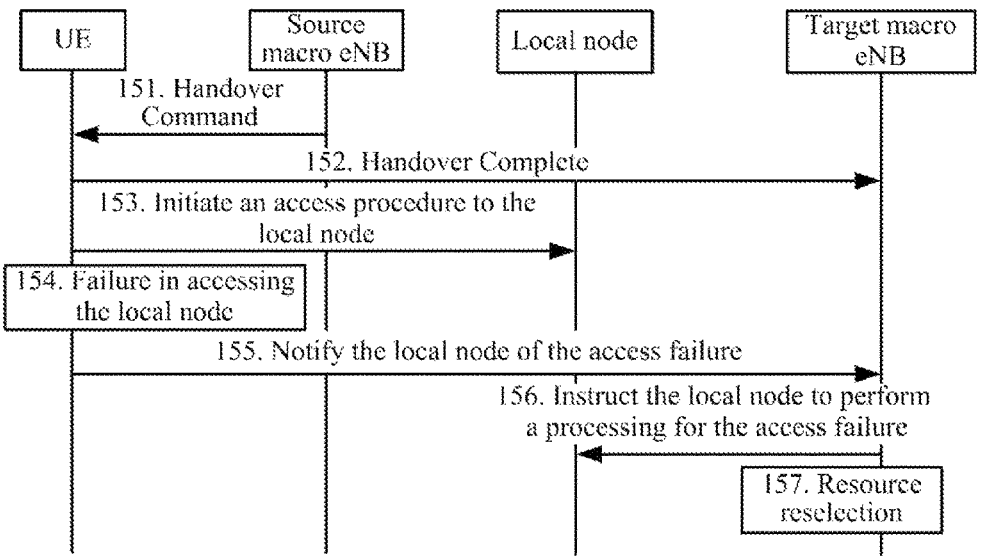
FIG. 15 illustrates an interaction flow chart between respective devices in an approach A according to an embodiment of the invention.

The interaction between the UE, the source macro eNB, the local node and the target macro eNB in the approach A will be described below in details in connection with a particular embodiment illustrated in FIG. 15, and an interaction process for the UE to be handed over from the source macro eNB to the target macro eNB in this embodiment is as follows:

Operation 151: The source macro eNB transmits a handover command to the UE;

Operation 152: The UE initiates a random access procedure to the target macro eNB upon reception of the handover command, where the UE stops data from being transmitted by the UE with the local node and the source macro eNB upon reception of the handover command;

Operation 153: The UE initiates an access procedure to the local node after completing the handover procedure with the target macro eNB;

Operation 154: The UE determines a failure in accessing the local node;

Operation 155: The UE notifies the target macro eNB of the failure of its access to the local node;

Operation 156: The target macro eNB notifies the local node to perform a process for the access failure, for example, by stopping transmitting data to the UE and receiving data transmitted by the UE; by releasing bearer configuration corresponding to the UE; by transmitting buffered data related to the UE to the target macro eNB; etc.; and Operation 157: The target macro eNB executes resources reselection, that is, reselects a local node to take on the bearer separation.

In an approach B, the local node determines whether there is a failure in the synchronization of the local node with the UE particularly as follows:

The local node starts a second timer (e.g., a timer T3, and a length of time of the timer T3 can be configured by the source macro eNB or the local node) upon reception of an notification transmitted by the source macro eNB to instruct the second timer to be started;

If the local node has not completed the synchronization procedure with the UE, or the quality of a channel of the local node to the UE has not been resumed, when the second timer expires, then the local node determines a failure of its synchronization with the UE; and The local node notifies the handover target macro eNB of the failure in synchronization of the local node with the UE.

Correspondingly upon reception of the notification transmitted by the local node about the failure in synchronization of the present node with the UE, the handover target macro eNB reselects a local node to which bearers are separated, and notifies the local node to release bearer configuration related to the UE and notifies the local node to transmit its buffered data related to the UE to the present eNB.

Figure 16:
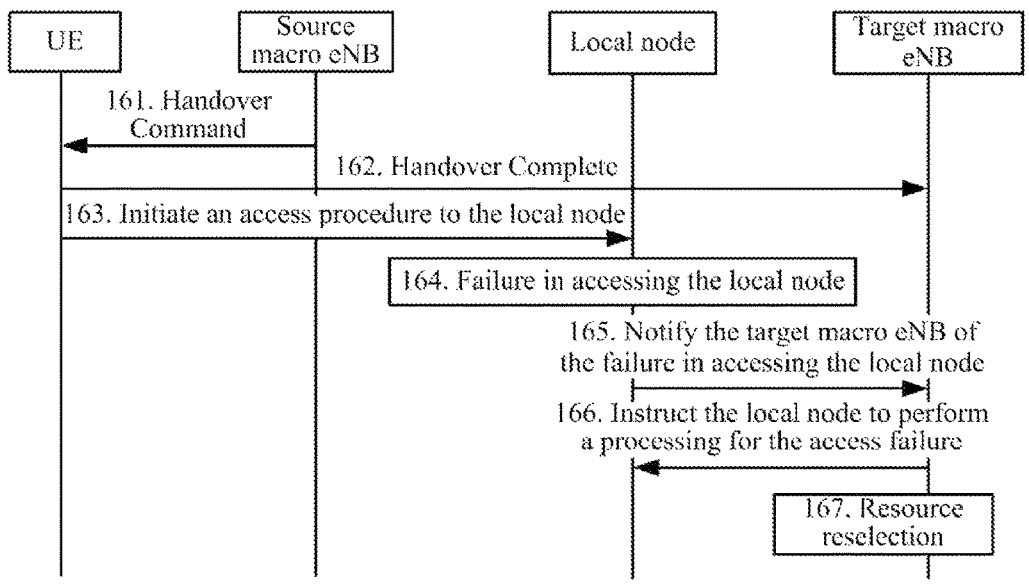
FIG. 16 illustrates an interaction flow chart between respective devices in an approach B according to an embodiment of the invention.

The interaction between the UE, the source macro eNB, the local node and the target macro eNB in the approach B will be described below in details in connection with a particular embodiment illustrated in FIG. 16, and an interaction process for the UE to be handed over from the source macro eNB to the target macro eNB in this embodiment is as follows:

Operation 161: The source macro eNB transmits a handover command to the UE;

Operation 162: The UE initiates a random access procedure to the target macro eNB upon reception of the handover command, where the UE stops data from being transmitted by the UE with the local node and the source macro eNB upon reception of the handover command;

Operation 163: The UE initiates an access procedure to the local node after completing the handover procedure with the target macro eNB;

Operation 164: The local node determines a failure of an access of the UE thereto;

Operation 165: The local node notifies the target macro eNB of the failure of the access of the UE thereto;

Operation 166: The target macro eNB instructs the local node to perform a process for the access failure, for example, by stopping transmitting data to the UE and receiving data transmitted by the UE; by releasing bearer configuration corresponding to the UE; by transmitting buffered data related to the UE to the target macro eNB; etc.; and Operation 167: The target macro eNB executes resources reselection, that is, reselects a local node to take on the bearer separation.

The processing flows of the methods above can be performed in software program which can be stored in a storage medium, which, upon being invoked, performs the operations of the methods above.

Figure 17:
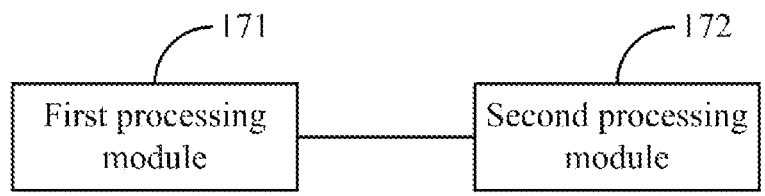
FIG. 17 illustrates a schematic structural diagram of an macro eNB which is a source macro eNB according to an embodiment of the invention.

Further to the embodiment above, referring to FIG. 17, an embodiment of the invention further provides a macro eNB including:

A first processing module 171 is configured to transmit a handover request to each candidate target macro eNB upon determining that there is a need to perform handover of a UE, where the handover request carries state information indicating that bearers are separated for the UE, and information about a local node where the UE currently resides and/or information about current bearers of the UE at the local node; and A second processing module 172 is configured to select from the candidate target macro eNBs returning a handover request response a target macro eNB to perform handover for the UE, to transmit a handover command carried in the handover request response returned by the handover target macro eNB to the UE, and to stop transmitting data to the UE and receiving data transmitted by the UE.

Furthermore the second processing module 172 is further configured:

To transmit configuration information of the handover target macro eNB respectively for the current bearers of the UE at the local node, and radio link configuration information and/or service cell configuration information of the local node, carried in the handover request response to the local node.

Furthermore the second processing module 172 is configured:

When it is determined that the UE stops transmitting data to the local node and receiving data transmitted by the local node, upon reception of the handover command, to transmit a first notification message to the local node to notify the local node to stop transmitting data to the UE and receiving data transmitted by the UE.

Furthermore the second processing module 172 is further configured:

To start a first timer after the handover request response returned by the candidate target macro eNB is received or the handover target macro eNB is selected; and if any UE Context Release Instruction transmitted by the handover target macro eNB has not been received when the first timer expires, to determine a failure in handover at the network side; to transmit a second notification message to the local node to instruct the local node to perform a corresponding processing according to the second notification message; and to transmit a third notification message to the UE to indicate to the UE the failure in handover at the network side to instruct the UE to perform a reestablishment procedure upon reception of the third notification message, Where the second notification message is configured to instruct the local node to stop transmitting data to the UE and receiving data transmitted by the UE, or the second notification message is configured to indicate the failure in handover at the network side; and the reestablishment target macro eNB is the same eNB as the target macro eNB where the handover fails.

Furthermore the second processing module 172 is further configured:

When it is determined that the UE stops transmitting data to the local node and receiving data transmitted by the local node, upon reception of the handover command, to transmit a fourth notification message to the local node to notify the local node to start a second timer used for determining whether the present node is synchronized successfully with the UE.

Figure 18:
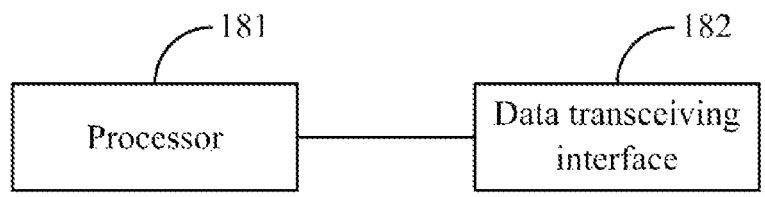
FIG. 18 illustrates a schematic structural diagram of another macro eNB which is a source macro eNB according to an embodiment of the invention.

An embodiment of the invention further provides a macro eNB, as illustrated in FIG. 18, including a processor 181 and a data transceiving interface 182, where:

The processor 181 is configured to transmit a handover request to each candidate target macro eNB upon determining that there is a need for performing handover of a UE, where the handover request carries state information indicating that bearers are separated for the UE, and information about a local node where the UE currently resides and/or information about current bearers of the UE at the local node; to select from the candidate target macro eNBs returning a handover request response a target macro eNB to perform handover for the UE, to transmit a handover command carried in the handover request response returned by the handover target macro eNB to the UE, and to stop transmitting data to the UE and receiving data transmitted by the UE; and The data transceiving interface 182 is configured to be controlled by the processor to transmit and receive data.

Figure 19:
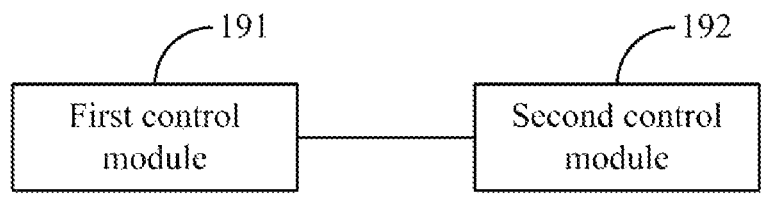
FIG. 19 illustrates a schematic structural diagram of an macro eNB which is a target macro eNB of the handover according to an embodiment of the invention.

Further to the embodiment above, referring to FIG. 19, an embodiment of the invention further provides another macro eNB including:

A first control module 191 is configured to make an admission decision upon reception of a handover request transmitted by a source macro eNB, where the handover request carries state information indicating that bearers are separated for a UE; and A second control module 192 is configured to perform underlying configuration of the UE at the present eNB, and to transmit a handover request response to the source macro eNB, upon determining that the present eNB allows the UE to be admitted and supports bearer separation, where the handover request response carries a switch command carrying a bearer separation support acknowledgement message and instructing the UE to perform handover.

Furthermore if the present eNB is a handover target macro eNB selected by the source macro eNB for the UE, then the second control module 192 is configured:

After it is determined that the present eNB allows the UE to be admitted, and before the handover request response is returned to the source macro eNB, to set up a dedicated bearer connection with a local node, and to transmit configuration information of the present eNB respectively for current bearers of the UE at the local node, and radio link configuration information and/or service cell configuration information of the local node to the local node over the dedicated bearer connection.

Furthermore the second control module 192 is further configured:

To transmit a first instruction message to the local node upon reception of a transmission resume request transmitted by the UE to instruct the local node to resume transmission of data to the UE and reception of data transmitted by the UE, where the transmission resume request is transmitted by the UE after completing the synchronization procedure with the local node.

Furthermore if the present eNB is a reestablishment target macro eNB which is the same as the target macro eNB where the handover fails, then the second control module 192 is configured:

After a reestablishment procedure with the UE is completed, to perform a corresponding processing according to the state information indicating that bearers are separated for the UE and information about the local node where the UE currently resides and/or the information about the current bearers of the UE at the local node.

Furthermore the second control module 192 is configured:

To transmit a second instruction message to the local node to notify the local node to forward data to be transmitted between the local node and the UE to the present eNB; or to initiate a bearer separation procedure to the local node, to update the resource configuration of the local node, and to notify the local node to resume transmission of data to the UE and reception of data transmitted by the UE, after the bearer separation procedure is completed.

Furthermore the second control module 192 is further configured:

Upon reception of a fifth informing message transmitted by the UE to indicate a failure in the synchronization of the UE with the local node, to reselect a local node to which bearers are separated, and to transmit the fifth informing message to the source macro eNB to instruct the source macro eNB to instruct the local node, where the synchronization fails, to release bearer configuration related to the UE and to notify the local node, where the synchronization fails, to transmit its buffered data related to the UE to the present eNB; or Upon reception of the fifth informing message transmitted by the UE, to reselect a local node to which bearers are separated and to notify the local node, where the synchronization fails, to release bearer configuration related to the UE and to notify the local node, where the synchronization fails, to transmit its buffered data related to the UE to the present eNB; or Upon reception of an notification transmitted by the local node on a failure in the synchronization of the local node with the UE, to reselect a local node to which bearers are separated and to notify the local node, where the synchronization fails, to release bearer configuration related to the UE and to notify the local node, where the synchronization fails, to transmit its buffered data related to the UE to the present eNB.

Furthermore the second control module 192 is further configured:

If a part of bearers of the UE at the present eNB need to be transferred to the local node after the handover, to carry transmission addresses of the bearers to be transferred in a path switch request transmitted to a core network; or If a part of bearers of the UE at the local node need to be transferred to the present eNB after the handover, to carry transmission addresses of the bearers to be transferred in a path switch request transmitted to a core network.

Figure 20:
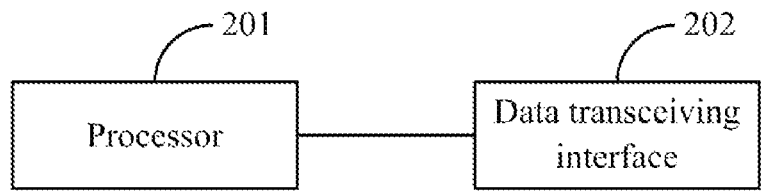
FIG. 20 illustrates a schematic structural diagram of another macro eNB which is a target macro eNB of the handover according to an embodiment of the invention.

An embodiment of the invention further provides another macro eNB, as illustrated in FIG. 20, including a processor 201 and a data transceiving interface 202, where:

The processor 201 is configured to make an admission decision upon reception of a handover request transmitted by a source macro eNB, where the handover request carries state information indicating that bearers are separated for a UE; to perform underlying configuration of the UE at the present eNB, and to return a handover request response to the source macro eNB, upon determining that the present eNB allows the UE to be admitted and supports bearer separation, where the handover request response carries a handover command carrying a bearer separation support acknowledgement message and instructing the UE to perform handover; and The data transceiving interface 202 is configured to be controlled by the processor to transmit and receive data.

Figure 21:
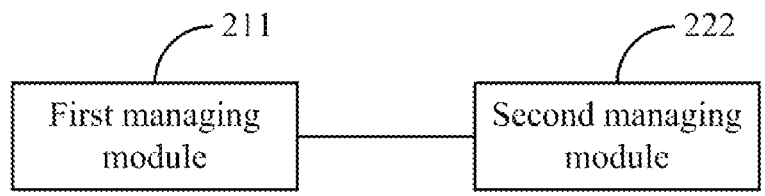
FIG. 21 illustrates a schematic structural diagram of a user equipment according to an embodiment of the invention.

Further to the embodiment above, referring to FIG. 21, an embodiment of the invention further provides a user equipment including:

A first managing module 211 is configured to stop transmitting data to a source macro eNB and receiving data transmitted by the source macro eNB, and to initiate a synchronization procedure to a handover target macro eNB, upon reception of a handover command, transmitted by the source macro eNB, carrying a bearer separation support acknowledgement message, where the UE stops transmitting data to a local node and receiving data transmitted by the local node, or keeps on transmitting data to the local node and receiving data transmitted by the local node; and A second managing module 212 is configured to transmit data respectively with the handover target macro eNB and the local node after completing the synchronization procedure with the handover target macro eNB.

Furthermore if the first managing module 211 stops transmitting data to the local node and receiving data transmitted by the local node, upon reception of the handover command transmitted by the source macro eNB, then the second managing module 212 is further configured:

To transmit a second informing message to the local node to instruct the local node to stop transmitting data to the UE and receiving data transmitted by the UE; or to transmit a third informing message to the source macro eNB to instruct the source macro eNB to notify the local node to stop transmitting data to the UE and receiving data transmitted by the UE.

Furthermore the second managing module 212 is further configured:

Upon reception of a third informing message transmitted by the source macro eNB, to determine a failure in handover at the network side, and to initiate a reestablishment procedure to a reestablishment target macro eNB; or When a failure of a Random Access (RA) with the handover target macro eNB is determined, to determine a failure in handover at the network side, and to initiate a reestablishment procedure to a reestablishment target macro eNB; or To start a configured third timer when a synchronization procedure is initiated to the handover target macro eNB, and if no feedback information from the handover target macro eNB has been received when the third timer expires, to determine a failure in handover at the network side, and to initiate a reestablishment procedure to a reestablishment target macro eNB, Where the reestablishment target macro eNB is the same eNB as the target macro eNB where the handover fails.

Furthermore if the first managing module 211 stops transmitting data to the local node and receiving data transmitted by the local node, upon reception of the handover command transmitted by the source macro eNB, then the second managing module 212 is further configured:

When a failure in handover at the network side is determined, to transmit a first informing message to the local node to indicate to the local node the failure in handover at the network side; and If the first managing module 211 keeps on transmitting data to the local node and receiving data transmitted by the local node upon reception of the handover command transmitted by the source macro eNB, then the second managing module 212 is further configured:

When a failure in handover at the network side is determined, to stop transmitting data to the local node and receiving data transmitted by the local node; and to transmit the first informing message to the local node to indicate to the local node the failure in handover at the network side.

Furthermore the second managing module 212 is configured:

When a reestablishment procedure is initiated to the reestablishment target macro eNB after a failure in handover at the network side is determined, to suspend bearers, which have not been separated to the local node, other than the Signaling Radio Bearer (SRB) 0, and to perform a cell selection procedure; and if the reestablishment procedure succeeds, to transmit data respectively with the reestablishment target macro eNB and the local node, and if the reestablishment procedure fails, to stop transmitting data to the local node and receiving data transmitted by the local node, to release its RRC connection with the reestablishment target macro eNB, and to enter an idle state.

Furthermore the second managing module 212 is configured:

If the reestablishment procedure fails, to transmit a fourth informing message to the local node to indicate to the local node the failure of the reestablishment procedure.

Furthermore if the first managing module 211 stops transmitting data to the local node and receiving data transmitted by the local node, upon reception of the handover command, then the second managing module 212 is further configured:

To initiate a synchronization procedure to the local node after completing the synchronization procedure with the handover target macro eNB; and if the synchronization with the local node succeeds, to transmit data to the local node and to receive data transmitted by the local node, and to transmit a transmission resume request to the target macro eNB to instruct the target macro eNB to notify the local node to resume transmission of data to the UE and reception of data transmitted by the UE, and if the synchronization with the local node fails, to transmit a fifth informing message to the handover target macro eNB to indicate a failure in the synchronization of the UE with the local node.

Furthermore if the first managing module 211 keeps on transmitting data to the local node and receiving data transmitted by the local node upon reception of the handover command, then the second managing module 212 is further configured:

To decode data transmitted by the local node using security parameters configured by the source macro eNB and security parameters, configured by the switch target macro eNB, carried in the handover command; and to stop decoding using the security parameters configured by the source macro eNB after successful decoding using the security parameters configured by the handover target macro eNB.

Figure 22:
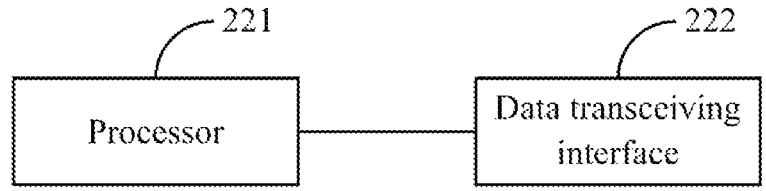
FIG. 22 illustrates a schematic structural diagram of another user equipment according to an embodiment of the invention.

An embodiment of the invention further provides a user equipment, as illustrated in FIG. 22, including a processor 221 and a data transceiving interface 222, where:

The processor 221 is configured to stop transmitting data to a source macro eNB and receiving data transmitted by the source macro eNB, and to initiate a synchronization procedure to a handover target macro eNB, upon reception of a handover command, transmitted by the source macro eNB, carrying a bearer separation support acknowledgement message, where the UE stops transmitting data to a local node and receiving data transmitted by the local node, or keeps on transmitting data to the local node and receiving data transmitted by the local node; and to transmit data respectively with the handover target macro eNB and the local node after completing the synchronization procedure with the handover target macro eNB; and The data transceiving interface 222 is configured to be controlled by the processor to transmit and receive data.

Figure 23:
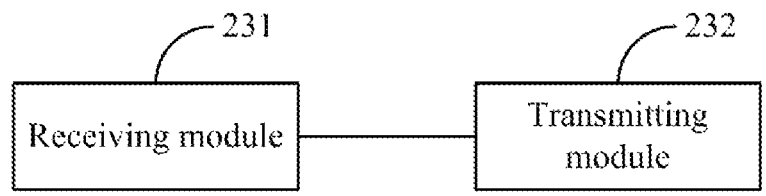
FIG. 23 illustrates a schematic structural diagram of a local node according to an embodiment of the invention.

Further to the embodiment above, referring to FIG. 23, an embodiment of the invention further provides a local node including:

A receiving module 231 is configured to receive configuration information transmitted by a source macro eNB or a handover target macro eNB; and A transmitting module 232 is configured to transmit data respectively with the UE and the handover target macro eNB using security parameters, configured by the handover target macro eNB, carried in the configuration information, Where the transmitting module 232 stops transmitting data to the UE and receiving data transmitted by the UE, or keeps on transmitting data to the UE or receiving data transmitted by the UE, in the handover process.

Furthermore if the receiving module 231 receives a first notification message transmitted by the source macro eNB or a second informing message transmitted by the UE, then the transmitting module 232 is configured to stop transmitting data to the UE and receiving data transmitted by the UE; and After the receiving module 231 receives a first instruction message transmitted by the handover target macro eNB, the transmitting module 232 is configured to resume transmission of data to the UE and reception of data transmitted by the UE.

Furthermore if the receiving module 231 receives a second notification message transmitted by the source macro eNB and the second notification message is configured to instruct the local node to stop transmitting data to the UE and receiving data transmitted by the UE, then the transmitting module 232 is configured to stop transmitting data to the UE and receiving data transmitted by the UE, and to release bearer configuration related to the UE;

If the receiving module 231 receives a second notification message transmitted by the source macro eNB and the second notification message is configured to indicate a failure in handover at the network side, then the transmitting module 232 is configured to keep on transmitting data to the UE and receiving data transmitted by the UE and to start a fourth timer; and if any instruction from a reestablishment target macro eNB has not been received when the fourth timer expires, to stop transmitting data to the UE and receiving data transmitted by the UE, and to release resource configuration related to the UE, where the reestablishment target macro eNB is the same eNB as the target macro eNB where the handover fails; and If the receiving module 231 receives a first informing message transmitted by the UE, then the transmitting module 232 is configured to release bearer configuration related to the UE.

Furthermore the transmitting module 232 is further configured:

To buffer data, related to the UE, which have not been processed or transmitted.

Furthermore if the receiving module 231 receives a second instruction message transmitted by the reestablishment target macro eNB, then the transmitting module 232 is configured to forward data to be transmitted between the local node and the UE to the reestablishment target macro eNB; and If the reestablishment target macro eNB initiates a bearer separation procedure, then the transmitting module 232 is configured to update resource configuration of the local node, and to resume transmitting data to the UE and receiving data transmitted by the UE after the bearer separation procedure with the reestablishment target macro eNB is completed.

Furthermore if the receiving module 231 receives an notification transmitted by the source macro eNB to instruct a second timer to be started, then the transmitting module 232 is configured to start the second timer, and if the synchronization procedure with the UE has not been completed, or the quality of a channel to the UE has not been resumed, when the second timer expires, to determine a failure of the synchronization of the local node with the UE, and to notify the handover target macro eNB of the failure in synchronization of the local node with the UE.

Figure 24:
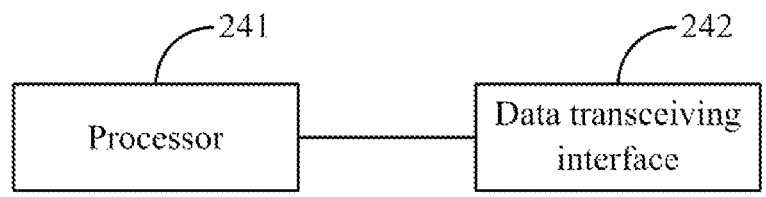
FIG. 24 illustrates a schematic structural diagram of another local node according to an embodiment of the invention.

An embodiment of the invention further provides a local node, as illustrated in FIG. 24, including a processor 241 and a data transceiving interface 242, where:

The processor 241 is configured to receive configuration information transmitted by a source macro eNB or a handover target macro eNB; and to transmit data respectively with the UE and the handover target macro eNB using security parameters, configured by the handover target macro eNB, carried in the configuration information, where data is stopped from being transmitted to the UE and data transmitted by the UE is stopped from being received, or transmitting data to the UE or receiving data transmitted by the UE is kept on, in the handover process; and The data transceiving interface 242 is configured to be controlled by the processor to transmit and receive data.

Figure 25:
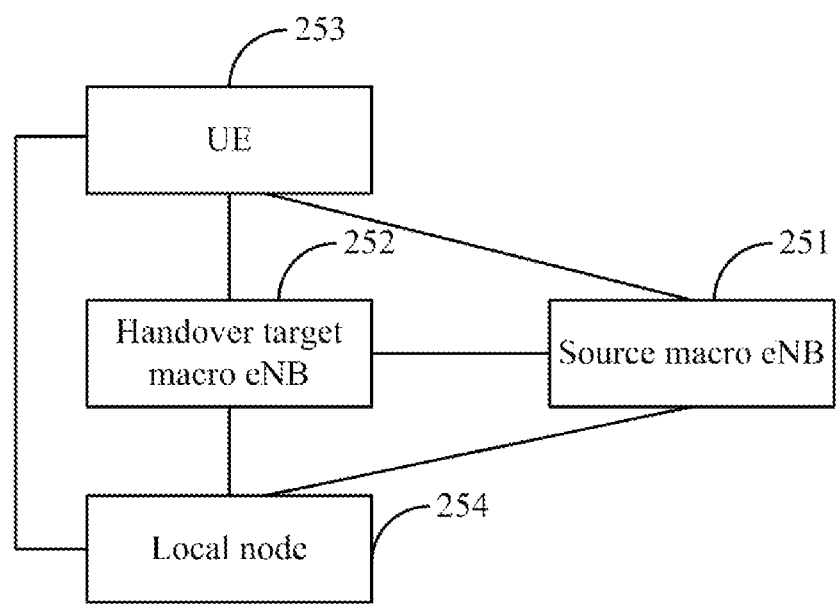
FIG. 25 illustrates a schematic structural diagram of a communication system according to an embodiment of the invention.

Further to the embodiment above, referring to FIG. 25, an embodiment of the invention further provides a communication system including:

A source macro eNB 251 is configured to transmit a handover request to each candidate target macro eNB upon determining that there is a need for performing a handover of a User Equipment (UE), where the handover request carries state information indicating that bearers are separated for the UE, and information about a local node where the UE currently resides and/or information about current bearers of the UE at the local node; and to select from the candidate target macro eNBs returning a handover request response a target macro eNB to perform handover for the UE, to transmit a handover command carried in the handover request response returned by the handover target macro eNB to the UE, and to stop transmitting data to the UE and receiving data transmitted by the UE;

The handover target macro eNB 252 is configured to make an admission decision upon reception of the handover request transmitted by the source macro eNB; to perform underlying configuration of the UE at the present eNB, and to return the handover request response to the source macro eNB, upon determining that the present eNB allows the UE to be admitted and supports bearer separation, where the switch request response carries a handover command carrying a bearer separation support acknowledgement message and instructing the UE to perform handover;

The UE 253 is configured to stop transmitting data to the source macro eNB and receiving data transmitted by the source macro eNB, and to initiate a synchronization procedure to the handover target macro eNB, upon reception of the handover command, transmitted by the source macro eNB, carrying the bearer separation support acknowledgement message, where the UE stops transmitting data to the local node and receiving data transmitted by the local node, or keeps on transmitting data to the local node and receiving data transmitted by the local node; and to transmit data respectively with the handover target macro eNB and the local node after completing the synchronization procedure with the handover target macro eNB.

The local node 254 is configured to receive configuration information transmitted by the source macro eNB or the handover target macro eNB; and to transmit data respectively with the UE and the handover target macro eNB using security parameters, configured by the handover target macro eNB, carried in the configuration information, where the local node stops transmitting data to the UE and receiving data transmitted by the UE, or keeps on transmitting data to the UE or receiving data transmitted by the UE, in the handover process.

The embodiments of the invention proposes a particular solution to the handover of a UE, for which bearers are separated, from a source macro eNB to a target macro eNB, and a particular solution to processing data in the handover process, in the bearer separation scenario so as to address the absence in the existing protocol of a particular solution to the handover of the UE between the macro eNBs, and a particular solution to transmitting data in the handover process, in the bearer separation scenario.

The embodiments of the invention enable the function of switching bearers to thereby further achieve the purpose of separating and aggregating bearers in the user plane and the control plane; the number of times that the user equipment is handed over in the control plane can be lowered to thereby lower the risk of a communication interruption when the user equipment being handed over in the case that the user equipment is handed over more frequently and for a larger number of times in the network architecture of the E-UTRAN.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for performing handover in a bearer separation scenario, the method comprising:
   transmitting, by a source macro evolved Node B (eNB), a handover request to each candidate target macro eNB upon determining that there is a need for performing a handover of a User Equipment, UE, wherein the handover request carries state information indicating that bearers are separated for the UE, and information about a local node where the UE currently resides and/or information about current bearers of the UE at the local node;
   selecting, by the source macro eNB, from candidate target macro eNBs returning a handover request response, a target macro eNB to perform the handover for the UE;
   transmitting, by the source macro eNB, a handover command carried in the handover request response returned by the handover target macro eNB to the UE; and
   stopping, by the source macro eNB, transmitting data to the UE and receiving data transmitted by the UE.

2. The method according to claim 1, wherein after the source macro eNB receives the handover request response returned by the handover target macro eNB, the method further comprises:
   transmitting, by the source macro eNB, configuration information of the handover target macro eNB respectively for the current bearers of the UE at the local node, and radio link configuration information and/or service cell configuration information of the local node, carried in the handover request response to the local node.

3. The method according to claim 1, wherein the method further comprises:
   after it is determined that the UE stops transmitting data to the local node and receiving data transmitted by the local node, upon reception of the handover command, transmitting, by the source macro eNB, a first notification message to the local node to notify the local node to stop transmitting data to the UE and receiving data transmitted by the UE.

4. The method according to claim 1, wherein after the source macro eNB receives the handover request response returned by the candidate target macro eNB or the source macro eNB selects the handover target macro eNB, the method further comprises
   starting, by the source macro eNB, a first timer; and
   if the source macro eNB has not received any UE Context Release Instruction transmitted by the handover target macro eNB when the first timer expires, then determining a failure in handover at the network side, and
   transmitting, by the source macro eNB, a second notification message to the local node to instruct the local node to perform a corresponding processing according to the second notification message, wherein the second notification message is configured to instruct the local node to stop transmitting data to the UE and receiving data transmitted by the UE, or the second notification message is configured to indicate the failure in handover at the network side, and
   transmitting, by the source macro eNB, a third notification message to the UE to indicate to the UE the failure in handover at the network side to instruct the UE to perform a reestablishment procedure upon reception of the third notification message, wherein a reestablishment target macro eNB is the same eNB as the target macro eNB wherein a handover fails.

5. The method according to claim 1, wherein the method further comprises:
   after it is determined that the UE stops transmitting data to the local node and receiving data transmitted by the local node, upon reception of the handover command, transmitting, by the source macro eNB, a fourth notification message to the local node to notify the local node to start a second timer used for determining whether the present node is synchronized successfully with the UE.

6. The method according to claim 1, wherein the method further comprises:
   receiving, by the source macro eNB, a local node change indication transmitted by the target macro eNB after the target macro eNB reselecting a local node for the UE according to an admission measurement decision, wherein the handover request response, received by the source macro eNB, transmitted by the target macro eNB comprises bearer configuration information and radio resource configuration information of the target macro eNB for the UE, information about an updated local node to which bearers are separated, and bearer configuration information and radio resource configuration information separated to the updated local node; and notifying, by the source macro eNB, the original local node of the handover request response notified by the target macro eNB.

* * * * *